(12) United States Patent
Sugasawa et al.

(10) Patent No.: US 11,977,033 B2
(45) Date of Patent: May 7, 2024

(54) LEARNING DEVICE, INSPECTION DEVICE, LEARNING METHOD, AND INSPECTION METHOD

(71) Applicant: Panasonic Intellectual Property Management Co., Ltd., Osaka (JP)

(72) Inventors: Yuya Sugasawa, Osaka (JP); Hideyuki Arai, Osaka (JP); Hisashi Aikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 532 days.

(21) Appl. No.: 17/053,107

(22) PCT Filed: May 13, 2019

(86) PCT No.: PCT/JP2019/018946
§ 371 (c)(1),
(2) Date: Nov. 5, 2020

(87) PCT Pub. No.: WO2019/230356
PCT Pub. Date: Dec. 5, 2019

(65) Prior Publication Data
US 2021/0233232 A1 Jul. 29, 2021

(30) Foreign Application Priority Data
May 31, 2018 (JP) .................. 2018-105352

(51) Int. Cl.
*G01N 21/00* (2006.01)
*G01N 21/88* (2006.01)
(Continued)

(52) U.S. Cl.
CPC ..... *G01N 21/8851* (2013.01); *G01N 21/8806* (2013.01); *G06N 3/08* (2013.01);
(Continued)

(58) Field of Classification Search
CPC .......... G01N 21/8851; G01N 21/8806; G01N 2021/8845; G01N 2021/8854;
(Continued)

(56) References Cited

U.S. PATENT DOCUMENTS

2007/0009152 A1  1/2007  Kanda
2007/0025611 A1  2/2007  Kanda et al.
(Continued)

FOREIGN PATENT DOCUMENTS

JP  2000-057349     2/2000
JP  2005-222304 A   8/2005
(Continued)

OTHER PUBLICATIONS

International Search Report of PCT application No. PCT/JP2019/018946 dated Jul. 30, 2019.

*Primary Examiner* — Abdullahi Nur
(74) *Attorney, Agent, or Firm* — Rimon P.C.

(57) ABSTRACT

A learning device includes a camera configured to acquire image data by imaging a sample of a product, a physical property information acquisition unit configured to acquire physical property information of the sample, and a processing unit configured to generate a learning model. The processing unit is configured to identify a category of the sample based on rule information relating the physical property information to the category, to generate teacher data by relating the identified category to the image data, and to generate a learning model by machine learning using the teacher data. The learning model outputs the category of the sample in response to an input of the image data of the sample.

27 Claims, 26 Drawing Sheets

(51) Int. Cl.
*G06N 3/08* (2023.01)
*G06N 20/00* (2019.01)
*G06T 7/00* (2017.01)
*G06V 10/143* (2022.01)
*G06V 10/764* (2022.01)
*G06V 10/774* (2022.01)
*G06V 20/00* (2022.01)

(52) U.S. Cl.
CPC ........... *G06N 20/00* (2019.01); *G06T 7/0006* (2013.01); *G06V 10/143* (2022.01); *G06V 10/764* (2022.01); *G06V 10/7747* (2022.01); *G06V 20/00* (2022.01); *G01N 2021/8845* (2013.01); *G01N 2021/8854* (2013.01); *G01N 2021/8887* (2013.01)

(58) Field of Classification Search
CPC ... G01N 2021/8887; G01N 2021/8883; G01N 2021/889; G01N 21/27; G01N 21/00; G06N 20/00; G06N 3/08; G06V 10/7747; G06V 20/00; G06T 7/0004
See application file for complete search history.

(56) References Cited

U.S. PATENT DOCUMENTS

| | | | |
|---|---|---|---|
| 2012/0314920 | A1 | 12/2012 | Prigent et al. |
| 2018/0107857 | A1* | 4/2018 | Dante .................. G01J 3/2823 |
| 2018/0232689 | A1* | 8/2018 | Minvielle ............... G06T 7/194 |
| 2020/0138360 | A1* | 5/2020 | Fan ........................ A61B 5/441 |

FOREIGN PATENT DOCUMENTS

| | | |
|---|---|---|
| JP | 2005-293264 | 10/2005 |
| JP | 2005-301823 | 10/2005 |
| JP | 2010-071826 | 4/2010 |
| JP | 2013-509629 A | 3/2013 |
| JP | 2018-096834 | 6/2018 |
| WO | 2017/074505 A1 | 5/2017 |
| WO | 2018/110575 | 6/2018 |

* cited by examiner

FIG. 6A

| Oxide | Category |
|---|---|
| Yes | Defective |
| No | Non-Defective |

FIG. 6B

| Scratch | Category |
|---|---|
| Yes | Defective |
| No | Non-Defective |

FIG. 7A

| Sample No | Input Image | Category |
|---|---|---|
| 1 | Image Data 1 | Cu,Al,Oxide |
| 2 | Image Data 2 | Cu,Oxide |

FIG. 7B

| Sample No | Input Image | Category |
|---|---|---|
| 1 | Image Data 1 | Defective |
| 2 | Image Data 2 | Non-Defective |

| Sample No | Input Image | Material | Position | Size |
|---|---|---|---|---|
| 1 | Image Data 1 | Cu | 200,240 | 160,130 |
| 1 | Image Data 1 | Oxide | 80,190 | 100,30 |
| 1 | Image Data 1 | Al | 300,120 | 90,80 |
| 2 | ⋮ | ⋮ | ⋮ | ⋮ |
| ⋮ | ⋮ | ⋮ | ⋮ | ⋮ |

FIG. 13B

| Scratch | Category |
|---------|----------|
| Yes | Defective |
| No | Non-Defective |

FIG. 13C

| Foreign Matter | Category |
|----------------|----------|
| Yes | Defective |
| No | Non-Defective |

FIG. 14A

| | Input Image | | Category |
|---|---|---|---|
| 1 | Image Data 1 | ◯ | Large Scratch |
| 2 | Image Data 2 | ◯ | No Scratch |
| 3 | Image Data 3 | ◯ | Small Scratch |

FIG. 14B

| Sample No | Input Image | | Category |
|---|---|---|---|
| 1 | Image Data 1 | ◯ | Defective |
| 2 | Image Data 2 | ◯ | Non-Defective |
| 3 | Image Data 3 | ◯ | Defective |

FIG. 14C

| Sample No | Input Image | | Category |
|---|---|---|---|
| 1 | Image Data 1 | ◯ | Defective |
| 2 | Image Data 2 | ◯ | Non-Defective |
| 3 | Image Data 3 | ◯ | Non-Defective |

FIG. 18A

| Sample No | Input Image | Category |
|---|---|---|
| 1 | Image Data 1 | No Scratch No Stain |
| 2 | Image Data 2 | With Scratch |
| 3 | Image Data 3 | With Stain |

FIG. 18B

| Sample No | Input Image | Category |
|---|---|---|
| 1 | Image Data 1 | Non-Defective |
| 2 | Image Data 2 | Defective |
| 3 | Image Data 3 | Defective |

FIG. 22
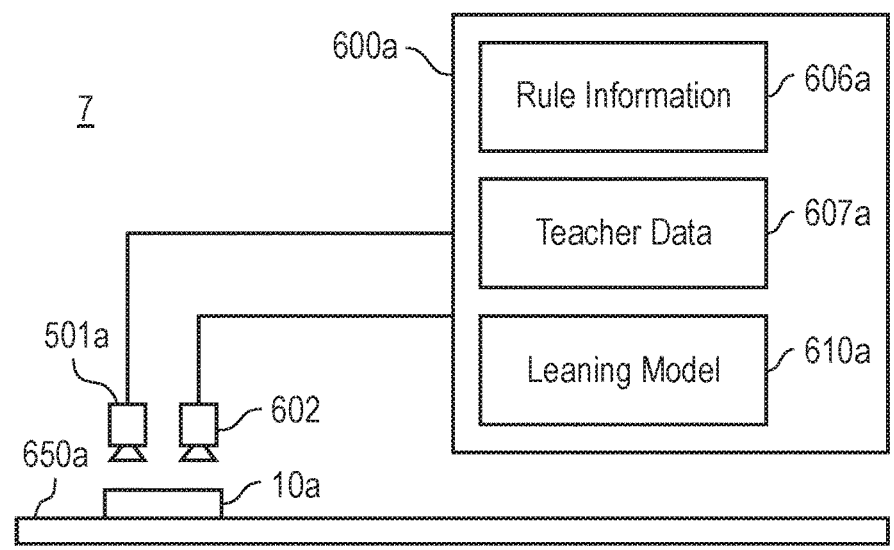
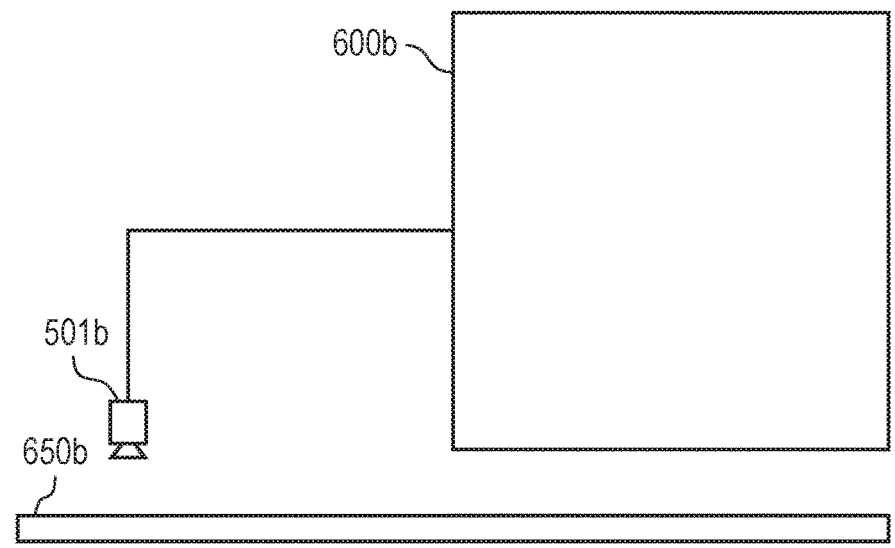
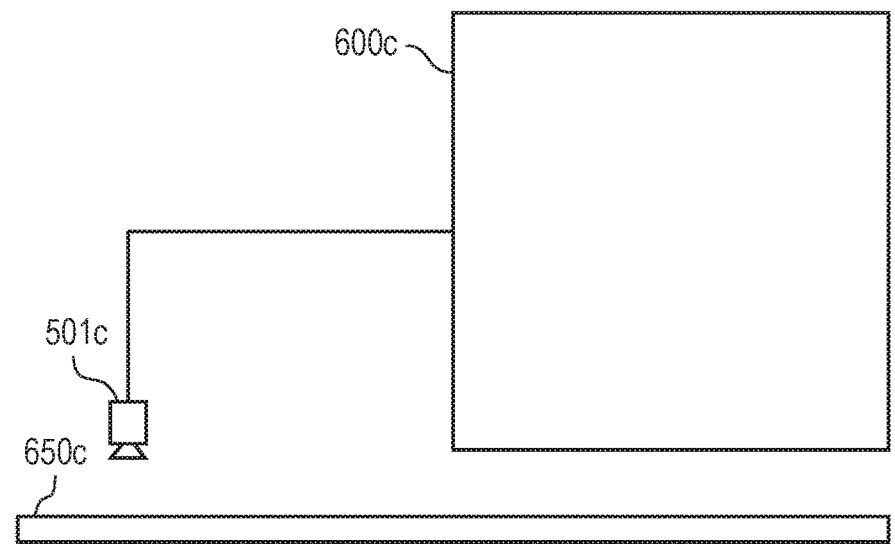

FIG. 23
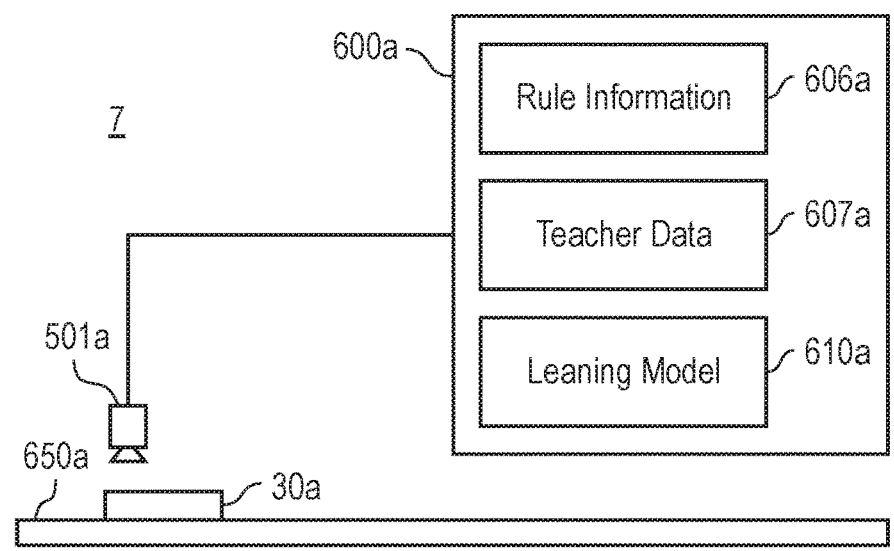
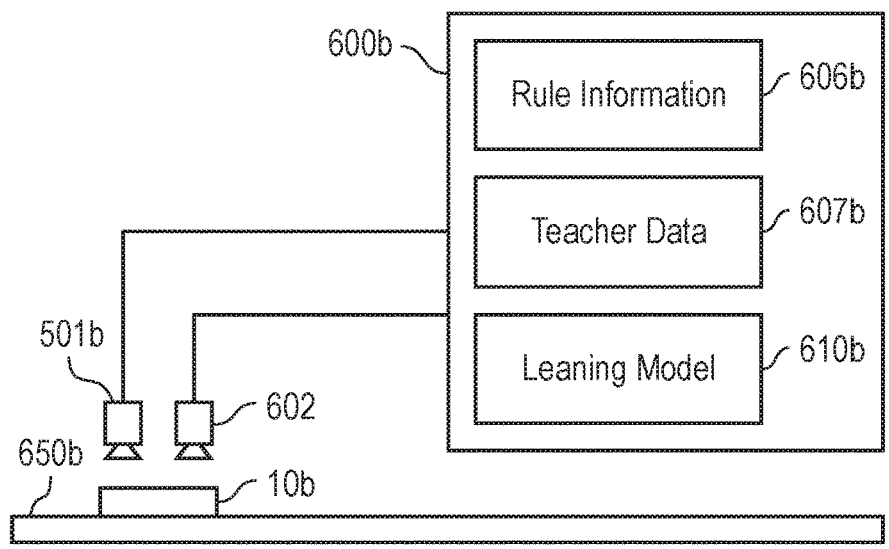
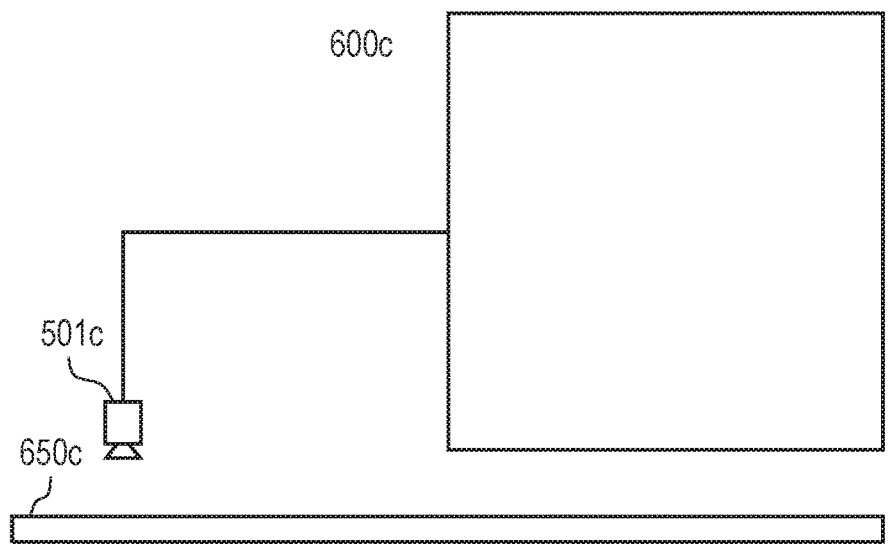

FIG. 24
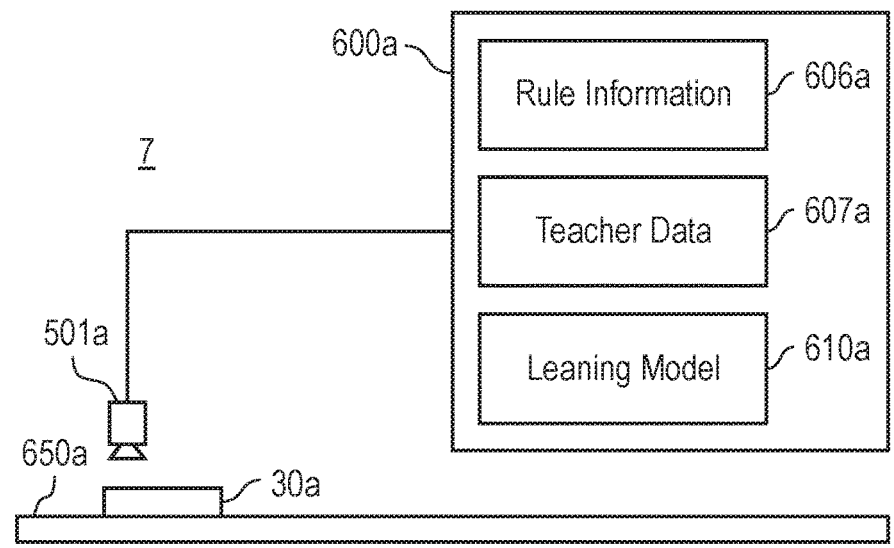
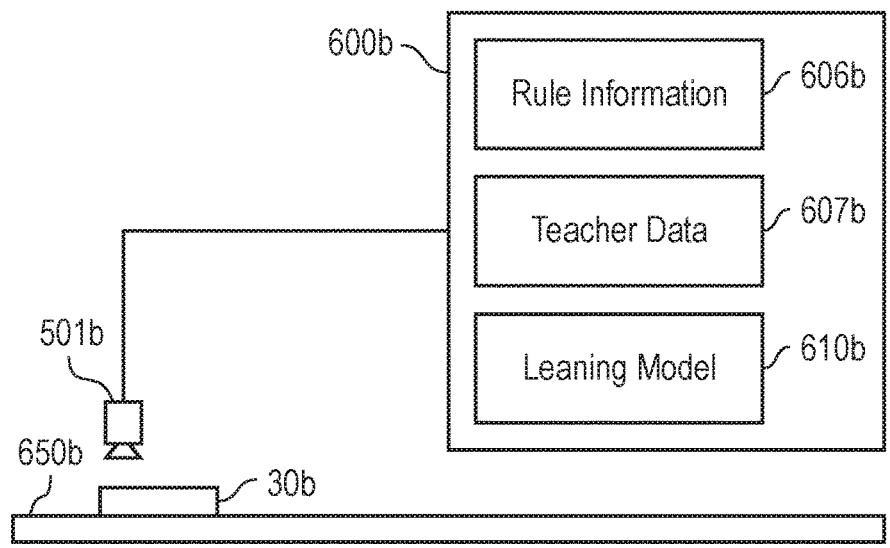
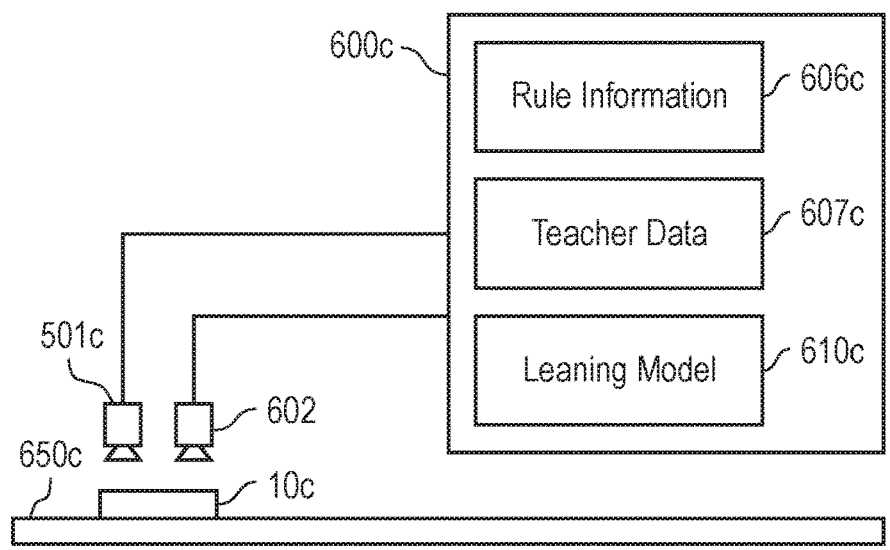

LEARNING DEVICE, INSPECTION DEVICE, LEARNING METHOD, AND INSPECTION METHOD

CROSS-REFERENCE TO RELATED APPLICATIONS

This application is a U.S. national stage application of the PCT international application No. PCT/JP2019/018946 filed on May 13, 2019, which claims the benefit of foreign priority of Japanese patent application No. 2018-105352 filed on May 31, 2018, the contents all of which are incorporated herein by reference.

TECHNICAL FIELD

The present disclosure relates to a learning device that learns captured image data.

BACKGROUND ART

PTL 1 discloses a defect classification method including a process of learning and acquiring teaching data, which indicates a relationship between a defect image for teaching and a category corresponding to a defect type, and a classification process of classifying a defect type based on the teaching data. Thereby, when classification is performed, a defect attribute of the input defect image can be classified.

CITATION LIST

Patent Literature

PTL 1: Japanese Patent Laid-Open Publication No. 2000-57349

SUMMARY

A learning device according to an aspect of the present disclosure includes a camera configured to acquire image data by imaging a sample of a product, a physical property information acquisition unit configured to acquire physical property information of the sample, and a processing unit configured to generate a learning model. The processing unit is configured to identify a category of the sample based on rule information relating the physical property information to the category, to generate teacher data by relating the identified category to the image data, and to generate a learning model by machine learning using the teacher data. The learning model outputs the category of the sample in response to an input of the image data of the sample.

In a learning method according to another aspect of the present disclosure, image data is acquired by imaging a sample of a product. Physical property information of the sample is acquired. A category of the sample is identified based on rule information relating the physical property information to the category. Teacher data is generated by relating the identified category to the image data. A learning model is generated by machine learning using the teacher data. The learning model outputs the category of the sample in response to an input of the image data of the sample.

The learning device and the learning method of the present disclosure generate a learning model by machine learning using the teacher data while reducing a burden of creation of the teacher data.

BRIEF DESCRIPTION OF DRAWINGS

FIG. 6A illustrates another example of rule information of the learning system according to Embodiment 1.

FIG. 6B illustrates another example of rule information of the learning system according to Embodiment 1.

FIG. 7A is a schematic diagram illustrating an example of teacher data of the learning system according to Embodiment 1.

FIG. 7B is a schematic diagram illustrating an example of teacher data of the learning system according to Embodiment 1.

FIG. 13B is a schematic diagram for explaining another example of rule information of the learning system according to Embodiment 2.

FIG. 13C is a schematic diagram for explaining another example of rule information of the learning system according to Embodiment 2.

FIG. 14A is a schematic diagram illustrating an example of teacher data of the learning system according to Embodiment 2.

FIG. 14B is a schematic diagram illustrating an example of teacher data of the learning system according to Embodiment 2.

FIG. 14C is a schematic diagram illustrating an example of teacher data of the learning system according to Embodiment 2.

FIG. 18A is a schematic diagram illustrating an example of teacher data of the learning system according to Embodiment 4.

FIG. 18B is a schematic diagram illustrating an example of teacher data of the learning system according to Embodiment 4.

FIG. 22 is a diagram illustrating an example of learning and inspection in three production lines of the inspection system according to Embodiment 6.

FIG. 23 is a diagram illustrating an example of learning and inspection in three production lines of the inspection system according to Embodiment 6.

FIG. 24 is a diagram illustrating an example of learning and inspection in three production lines of the inspection system according to Embodiment 6.

DETAIL DESCRIPTION OF PREFERRED EMBODIMENTS

Exemplary embodiments will be detailed below with reference to the drawings as appropriate. Here, more detailed description than necessary may be omitted. For example, a detailed description of well-known matters or a duplicated description of substantially the same configuration may be omitted. This is to prevent the following description from being unnecessarily redundant and to facilitate understanding of those skilled in the art.

The accompanying drawings and the following description are provided by the inventor(s) such that those skilled in the art can sufficiently understand the present disclosure, and are not intended to limit the subject matter described in the claims.

Idea Reaching of Present Disclosure

A product manufactured by a manufacturing process is often inspected as to whether or not the product has a desired quality. In a case where the product has unintended impurities or is scratched, or in a case where purity of the product, such as a reagent, does not reach a specified value and does not reach a desired grade, the product is determined not to reach a desired quality. In addition, commercial foods, such as vegetables or fresh fishes, are examined as to contamination with foreign matters, the presence or absence of scratches, freshness, and the like, and are inspected as to whether or not the foods have a desired quality.

In order to reduce man-hours of the inspection process or to improve accuracy in the inspection, in the related art, defects such as impurities or scratches on a front surface of a product are detected by analyzing image data of the product, and thus whether the product is a non-defective product or a defective product is determined. As one of such techniques, there is disclosed a technique of generating a learning model by machine learning such as neural network using teacher data which is image data related to categories according to products such as non-defective products or defective products from plural categories, and performing inspection of classifying a product into a non-defective product or a defective product by using the learning model based on image data of the product.

Figure 1:
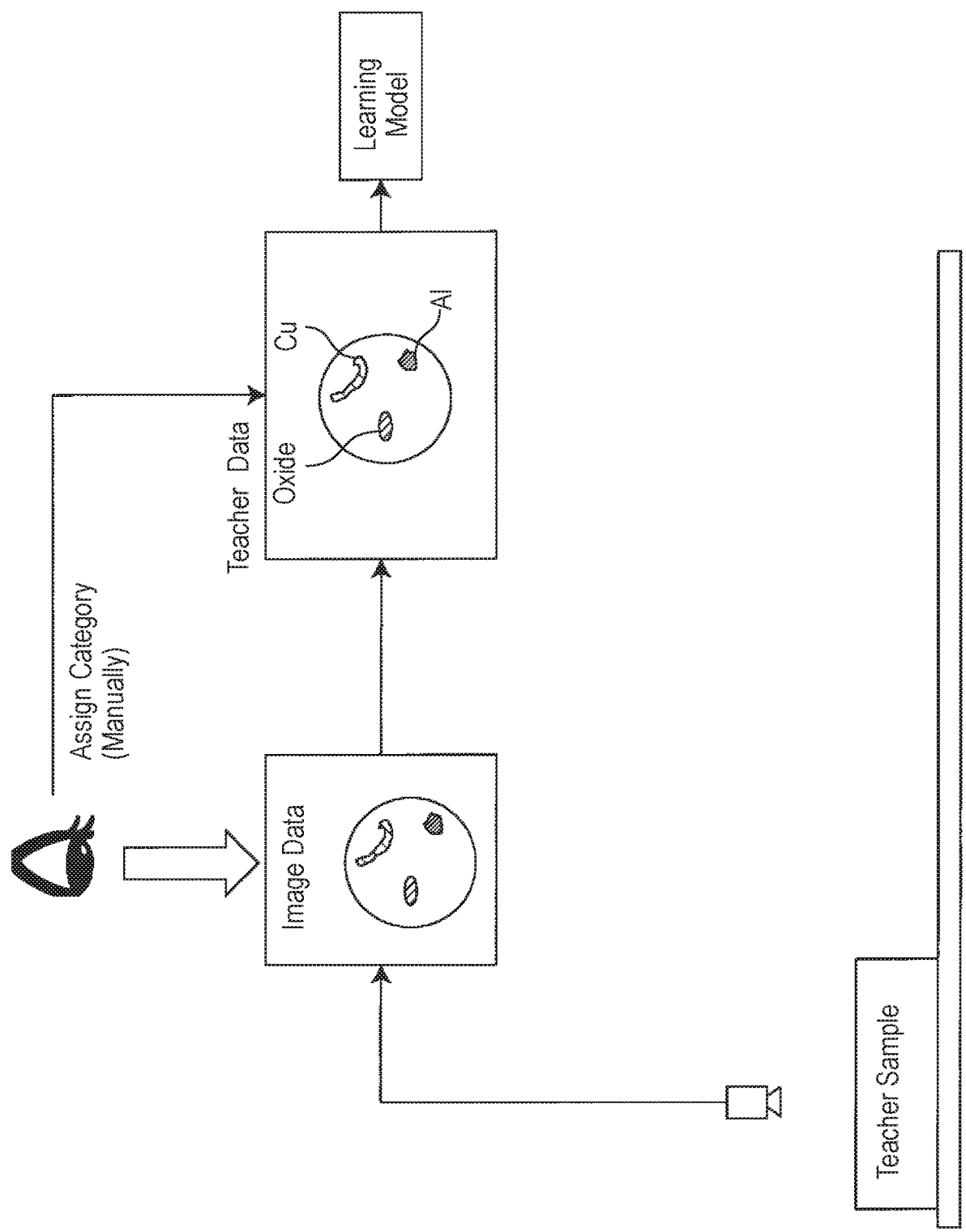
FIG. 1 is a schematic diagram illustrating a method of generating teacher data for a conventional learning model.

FIG. 1 is a schematic diagram illustrating a method of generating teacher data for a learning model of a comparative example. In the technique in the related art, in order to create teacher data, first, a teacher sample for creating teacher data is imaged by a camera, and thus image data of the teacher sample is obtained. Next, an operator visually confirms the image, identifies a category corresponding to a defect in the image among the plural categories, and assigns the identified category to the image data, thereby generating the teacher data. In general, the categories are classifications indicating foreign matters, impurities, defects including scratches, grades, or qualities. In the example shown in FIG. 1, one category of the plural categories of Cu, Al, and oxide is assigned to each defect.

As described above, in the method illustrated in FIG. 1, the generation of the teacher data, particularly, the identification of the category, is performed by a human. This method requires a large amount of labor since a large number of teacher data images are necessary to configure an effective learning model. In particular, since a defect rate of manufactured products is generally low, a large amount of human cost is required to visually identify defective samples from a large number of images of products with no defect.

In addition, when classification is manually performed by a person, a quality of the teacher data may be deteriorated due to a human error, such as determining a defective product as a non-defective product. As a result, when category assignment is manually performed, in addition to an increase in human cost, a quality of the teacher data is decreased and thus accuracy in the inspection using the learning model is decreased.

A learning device according to the present disclosure reduces a burden in generation of the teacher data and generates a learning model. An inspection device according to the present disclosure uses the learning model.

Exemplary Embodiment 1

1-1. Configuration

Figure 2:
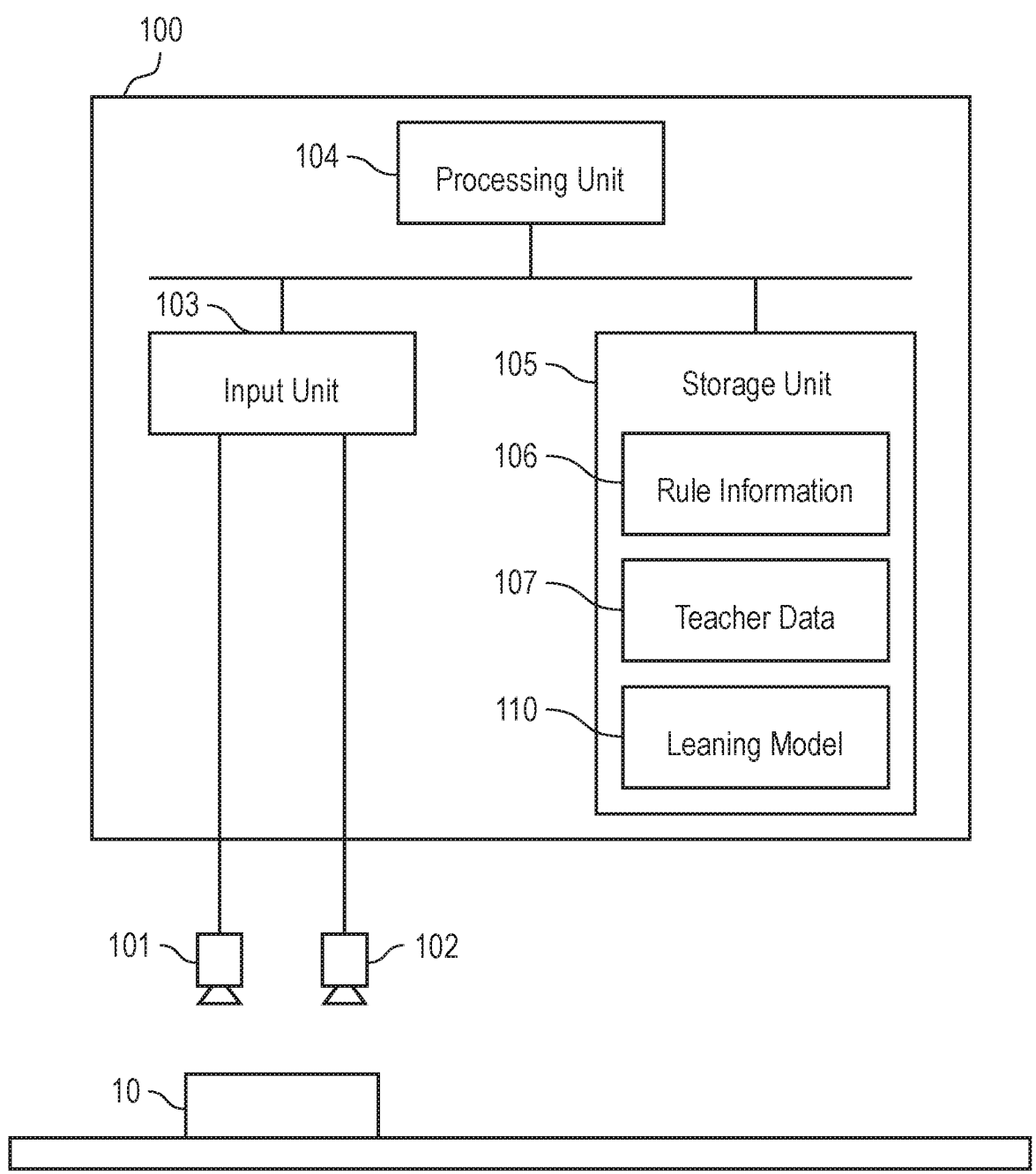
FIG. 2 illustrates a learning system according to Exemplary Embodiment 1.
Figure 3:
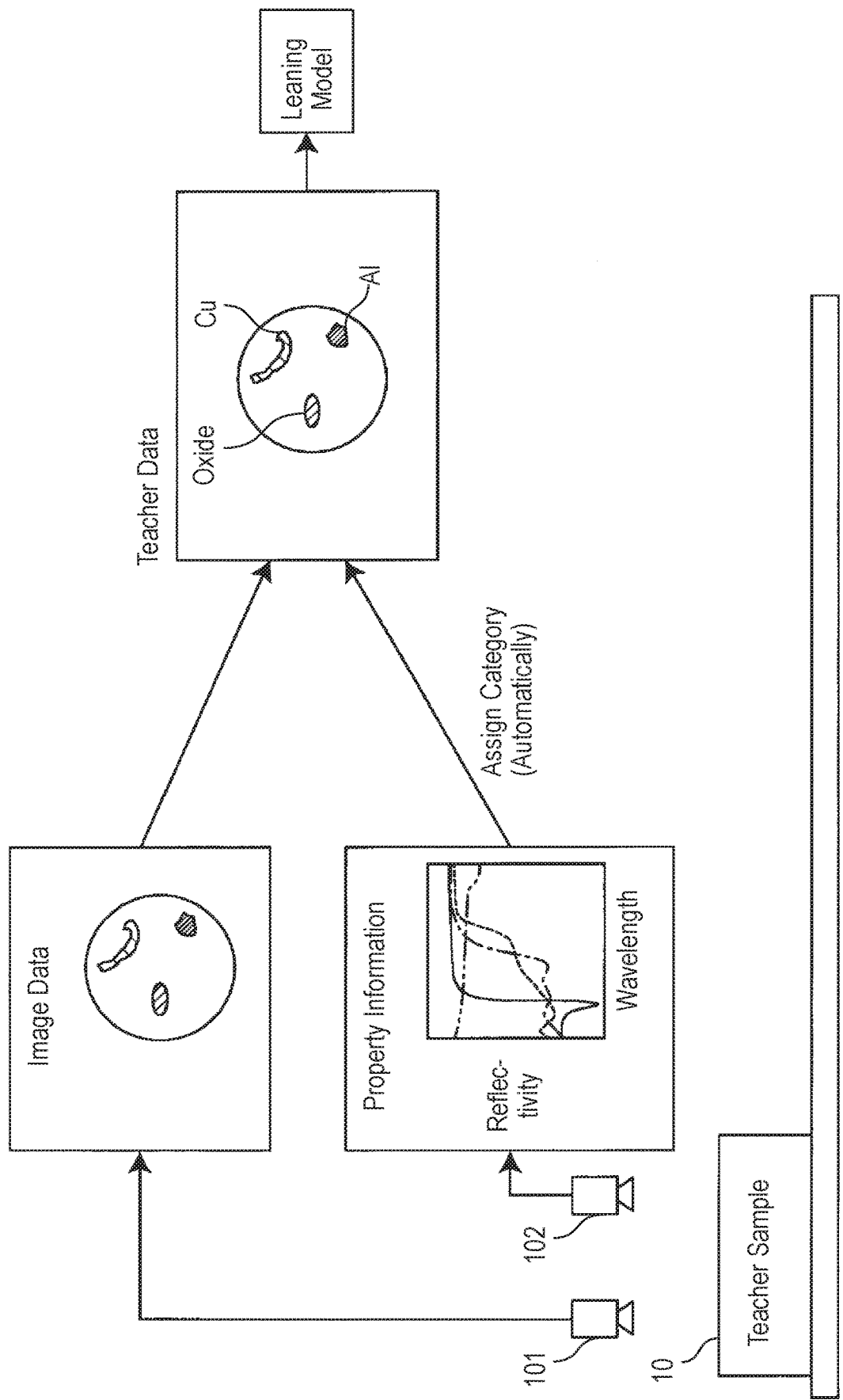
FIG. 3 is a schematic diagram for explaining a learning model generation method performed by a learning device according to Embodiment 1.

FIG. 2 is a diagram illustrating a configuration of learning system 1 according to Exemplary Embodiment 1. Learning system 1 includes learning device 100, camera 101, and physical property information acquisition unit 102. FIG. 3 is a schematic diagram for explaining a learning model generation method performed by the learning device according to Embodiment 1. In accordance with the present embodiment, image data is obtained by imaging teacher sample 10 by camera 101 for obtaining the teacher data. Physical property information acquisition unit 102 acquires physical property information of teacher sample 10. In accordance with Embodiment 1, physical property information acquisition unit 102 is a hyperspectral camera, and acquires reflection spectrum information as physical property information of teacher sample 10. Next, based on the physical property information, teacher data is created by automatically assigning, to the image data, one category among plural categories of category items. The teacher data includes the image data and a category assigned to the image data. A large number of pieces of teacher data can thus be automatically created. Further, the learning device (a computer) generates a learning model by learning a machine learning model based on a large number of pieces of teacher data.

The machine learning model is, for example, a neural network, determination tree learning, or a support vector machine.

In the present specification, "physical property information" is information indicating a composition or a property of an object, such as teacher sample 10. The information is typically obtained by observing a response from the object when an electromagnetic wave, a voltage, a current, a heat, or the like is applied to the object.

In accordance with the present embodiment, the physical property information includes reflection spectrum information obtained by irradiating teacher sample 10 with light and measuring a wavelength and an intensity of the light reflected on teacher sample 10. In particular, in the present embodiment, the physical property information obtained by physical property information acquisition unit 102, which is a hyperspectral camera, is hyperspectral data that is reflection spectrum information indicating a spectrum of reflected light, which is dispersed into a large number of narrow wavelength bands (bandwidths) in each pixel of an image of teacher sample 10 obtained by imaging teacher sample 10. In Embodiment 1, the number of wavelength bands is, for example, several tens to several hundreds. The reflection spectrum information is used as information indicating a composition of a material of teacher sample 10.

Physical property information acquisition unit 102 is a hyperspectral camera that acquires physical property information of teacher sample 10. Learning device 100 automatically creates teacher data 107 in which the image of teacher sample 10 is related to the category assigned to teacher sample 10.

Learning device 100 includes input unit 103 that receives the image data imaged by camera 101 and the physical property information acquired by physical property information acquisition unit 102. Learning device 100 further includes processing unit 104 that creates teacher data 107 and learning model 110 by processing the image data and the physical property information, and storage unit 105 that stores various data. As described later, learning model 110 is generated by processing unit 104 based on a large number of pieces of teacher data 107.

Processing unit 104 is a controller that controls the entire operation of learning device 100. Processing unit 104 includes a general-purpose processor, such as a CPU or an MPU that realizes a predetermined function by executing a program. Processing unit 104 realizes various controls of learning device 100 by calling and executing a control program stored in storage unit 105. Processing unit 104 is not limited to one that realizes a predetermined function by cooperation of hardware and software, and may be a dedicated hardware circuit designed for realizing a predetermined function. That is, processing unit 104 can be implemented by various processors, such as a CPU, an MPU, a GPU, an FPGA, a DSP, or an ASIC.

Storage unit 105 is a recording medium, such as a RAM, a ROM, a hard disk, or an SSD. Storage unit 105 stores rule information 106 for determining a category of physical property information, teacher data 107, learning model 110, and the like.

Input unit 103 is an interface circuit (module) that connects peripheral devices, such as camera 101, and physical property information acquisition unit 102 to learning device 100. As input unit 103, various interfaces, such as Universal Serial Bus (USB), High Definition Multimedia Interface (HDMI) (registered trademark), IEEE1394, and Bluetooth (registered trademark), are used.

Camera 101 is, for example, an RGB camera including an image sensor, such as a CCD or a CMOS image sensor, an infrared camera, or a monochrome camera.

The hyperspectral camera, which is physical property information acquisition unit 102, acquires, for each pixel, hyperspectral data that is reflection spectrum information indicating a reflection spectrum, which is dispersed into a large number (for example, several tens to several hundreds) of narrow wavelength bands (bandwidths). The hyperspectral camera can obtain more detailed physical property information than an RGB camera that can acquire only information of three bands. Further, in spectrometric measurement in the related art, a spectrum is measured at one point of a sample, whereas the hyperspectral camera, which is physical property information acquisition unit 102 of Embodiment 1, can measure continuous spectra for every pixel of a planar region within a visual field.

Figure 4:
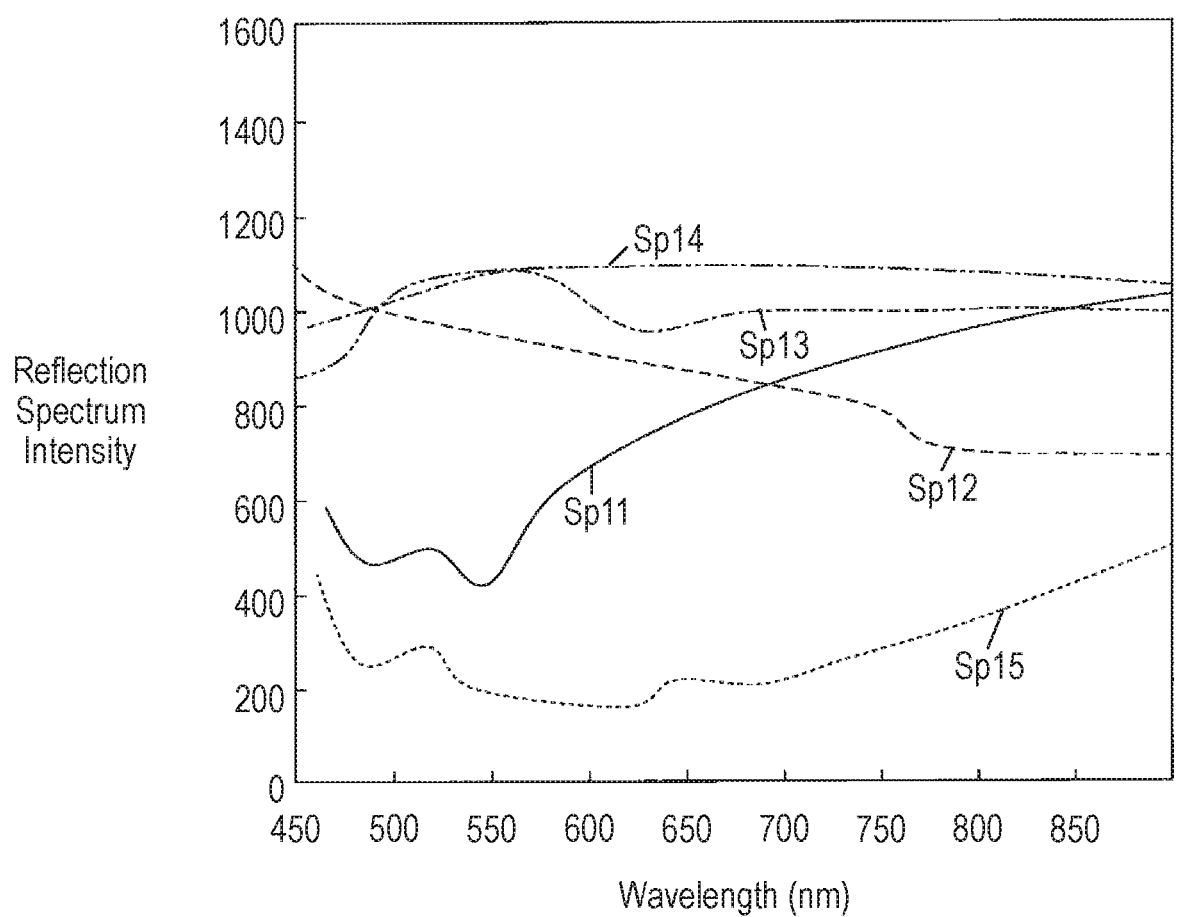
FIG. 4 is a graph illustrating reflection spectra of a fiber, a hair, a plastic, aluminum (Al), and copper (Cu) obtained by a hyperspectral camera.

FIG. 4 is a graph illustrating reflection spectra of a fiber, a hair, a plastic, aluminum (Al), and copper (Cu) obtained by the hyperspectral camera, which is physical property information acquisition unit 102. Specifically, FIG. 4 illustrates Cu reflection spectrum Sp11 (solid line), Al reflection spectrum Sp12 (broken line), plastic reflection spectrum Sp13 (one-dot chain line), and fiber reflection spectrum Sp14 (two-dot chain line), and hair reflection spectrum Sp15 (dotted line). The hyperspectral camera provides information that allows identification of various materials including the materials illustrated in FIG. 4 by acquiring spectrum information in several tens to several hundreds of wavelength bands. Therefore, in the present embodiment, a category of teacher sample 10 can be identified with the hyperspectral camera as physical property information acquisition unit 102. The category of teacher sample 10 is, for example, a material, a position, or an amount of impurities (refer to FIG. 3) on teacher sample 10.

The category of teacher sample 10 is determined based on rule information 106 illustrated in FIG. 2. Rule information 106 is, for example, reflection spectrum data. For example, in a case where learning device 100 includes Cu reflection spectrum data as rule information 106 and a reflection spectrum of a pixel of the image acquired by physical property information acquisition unit 102, which is a hyperspectral camera, matches with rule information 106, learning device 100 can identify that the material in the pixel is Cu.

1-1-1. Rule Information

Figure 5:
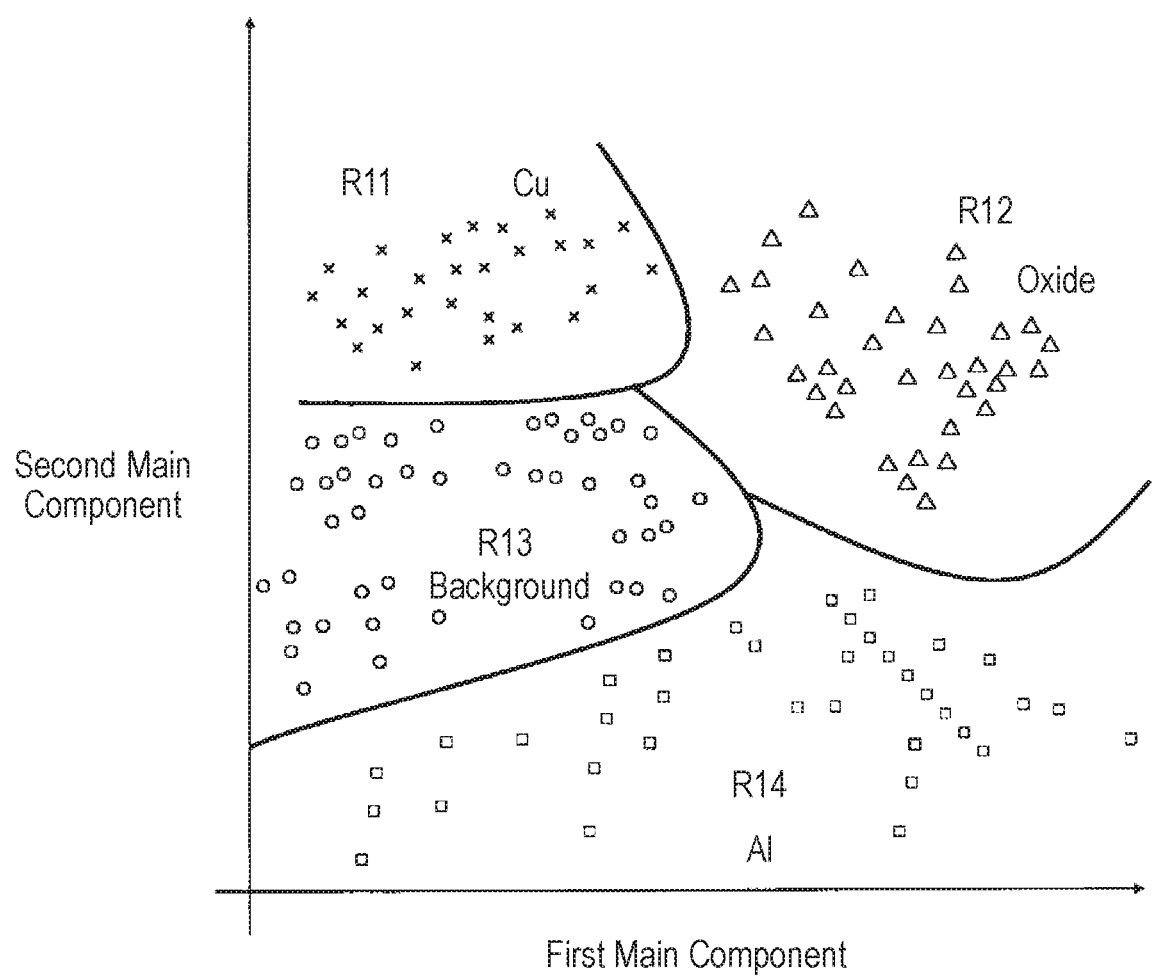
FIG. 5 is a schematic diagram explaining an example of rule information of the learning system according to Embodiment 1.

FIG. 5 is a schematic diagram for explaining an example of rule information 106. Teacher sample 10 is measured by the hyperspectral camera, which is physical property information acquisition unit 102, and then, hyperspectral data of a background (for example, a board) and impurities (for example, Cu, Al, or oxide) on teacher sample 10 is obtained.

As illustrated in FIG. 5, main component analysis is performed on the obtained hyperspectral data, and pieces of feature data indicating the background and each material of the impurities are plotted in a main component space. The pieces of feature data, which are results obtained by performing main component analysis on pieces of the hyperspectral data of different materials, are plotted in different regions in a two-dimensional main component space represented by, for example, a first main component and a second main component. For example, in FIG. 5, region R11 in the main component space corresponds to Cu, region R12 in the main component space corresponds to oxide, region R13 in the main component space corresponds to the background, and region R14 in the main component space corresponds to Al. Rule information 106 corresponds to a boundary line for identifying regions R11 to R14. Rule information 106 can identify a material or a category corresponding to the measured reflection spectrum.

The main component analysis is well-known analysis for generating feature data having a dimension smaller than the dimension of the hyperspectral data. The hyperspectral data has, for example, a dimension of the number of products of the number of bands (for example, 100) and the number of pixels. By performing main component analysis on the pieces of the hyperspectral data, for example, two-dimensional data represented by the first main component and the second main component can be created.

The main component analysis is an example, and a method of analyzing physical property information such as hyperspectral data is not limited thereto. For analysis of physical property information, general multivariate analysis such as multiple regression analysis, factor analysis, or cluster analysis may be used. In addition, a threshold value of a parameter may be set, and classification may be performed based on the threshold value.

Further, in order to determine rule information 106, instead of obtaining the hyperspectral data by measuring teacher sample 10, for example, known spectrum data such as Cu reflection spectrum data or Al reflection spectrum data may be used.

FIG. 6A and FIG. 6B are diagrams illustrating another example of rule information 106. Rule information 106 is not limited to information for identifying components of a target object as illustrated in FIG. 5. As illustrated in FIG. 6A, rule information 106 may be information for identifying components of a target object and determining that the target object is defective (a defective product) in a case where oxide is included in teacher sample 10 or determining that the target object is non-defective (a non-defective product) in a case where oxide is not included in teacher sample 10. In this case, the category item indicates a defect and a non-defect of a target object, and includes two categories of a defect and a non-defect. Alternatively, as illustrated in FIG. 6B, rule information 106 may be information for determining that the product is defective (a defective product) in a case where teacher sample 10 has a scratch and determining that the product is non-defective (a non-defective product) in a case where teacher sample 10 does not have a scratch.

Rule information 106 may be information for determining that the product is defective in a case where teacher sample 10 has a scratch with a predetermined size or more and determining that the product is non-defective in a case where teacher sample 10 has a scratch smaller than the predetermined size. Rule information 106 may be a combination of pieces of the rule information. Rule information 106 is not limited to the information.

1-1-2. Teacher Data

FIGS. 7A to 9B are schematic diagrams illustrating examples of teacher data 107. Teacher data 107 is data in which an image (input image) of teacher sample 10 imaged by camera 101 is related to a category to be assigned to teacher sample 10.

FIG. 7A illustrates an example of teacher data 107 in which an input image is related to a category indicating a type of impurities included in the input image. In this case, the category item indicates a type of impurities, and a plurality of categories are assigned to each of samples 1 and 2. Specifically, three categories of Cu/Al/oxide are assigned to sample 1, and two categories of Cu/oxide are assigned to sample 2. The category related to the image data of teacher data 107 may be a defect (a defective product) or a non-defect as illustrated in FIG. 7B. In this case, the category item indicates a defect and a non-defect of a target object, and includes two categories of a defect and a non-defect.

Figure 8A:
FIG. 8A is a schematic diagram illustrating an example of teacher data of the learning system according to Embodiment 1.
Figure 8B:
FIG. 8B is a schematic diagram illustrating an example of teacher data of the learning system according to Embodiment 1.

FIG. 8A and FIG. 8B are examples of so-called segmentation teacher data 107, which assigns, to each pixel of the input image, a meaning of a physical characteristic and a scientific characteristic of a portion of a sample at a position of the pixel. The segmentation means, for example, obtaining an image as illustrated in a category column of FIG. 8A by identifying a category of each pixel, coloring the background with black color, coloring Cu with red color, coloring oxide with blue color, and coloring Al with yellow color.

In teacher data 107, the segmented image may be related to the input image, as a category. Specifically, as illustrated in FIG. 8B, in segmentation teacher data 107, a material appearing in each pixel of the input image is related to the input image. That is, the category of each pixel is related to the input image.

Figures 9A, 9B:
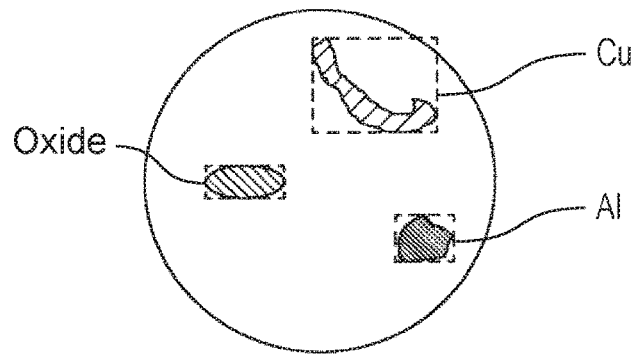
FIG. 9A is a schematic diagram illustrating an example of teacher data of the learning system according to Embodiment 1.
FIG. 9B is a schematic diagram illustrating an example of teacher data of the learning system according to Embodiment 1.

FIG. 9B is an example of object detection teacher data 107 indicating materials in the input image and positions of the materials. For example, for the input image of sample 10 as illustrated in FIG. 9A, teacher data 107 of FIG. 9B includes data indicating positions and sizes of Cu, oxide, and Al.

Figure 10:
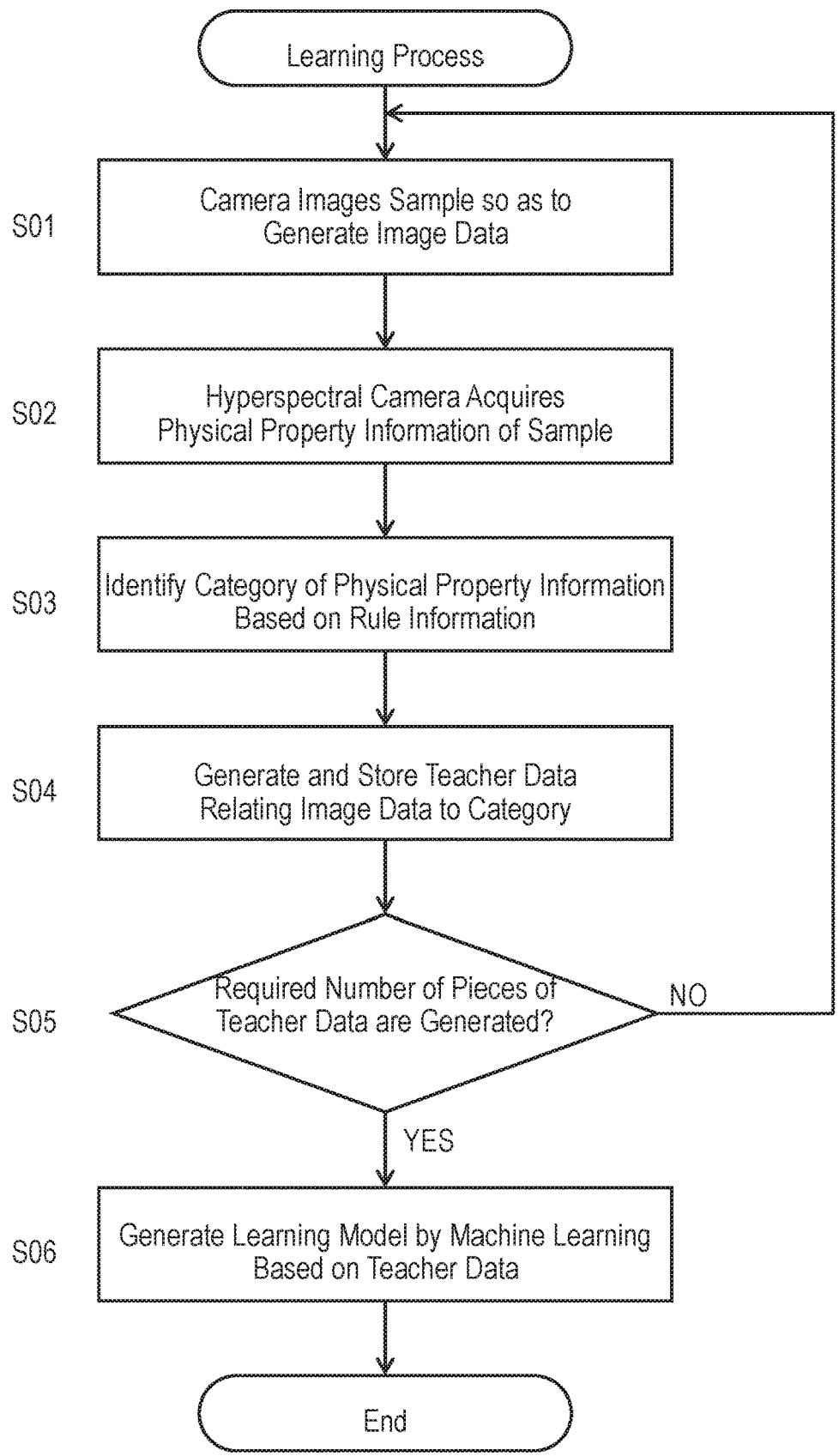
FIG. 10 is a flowchart illustrating a learning processing by the learning system according to Embodiment 1.

1-2. Operation FIG. 10 is a flowchart illustrating a flow of learning processing by learning system 1 according to the present embodiment. The learning processing by learning system 1 according to the present embodiment will be described with reference to FIG. 2 and FIG. 10.

First, camera 101 generates image data by imaging teacher sample 10 (step S01). Physical property information acquisition unit 102, which is a hyperspectral camera, acquires physical property information of teacher sample 10, specifically, hyperspectral data (step S02). The order of step S01 and step S02 may be reversed, or may be the same.

Figure 11:
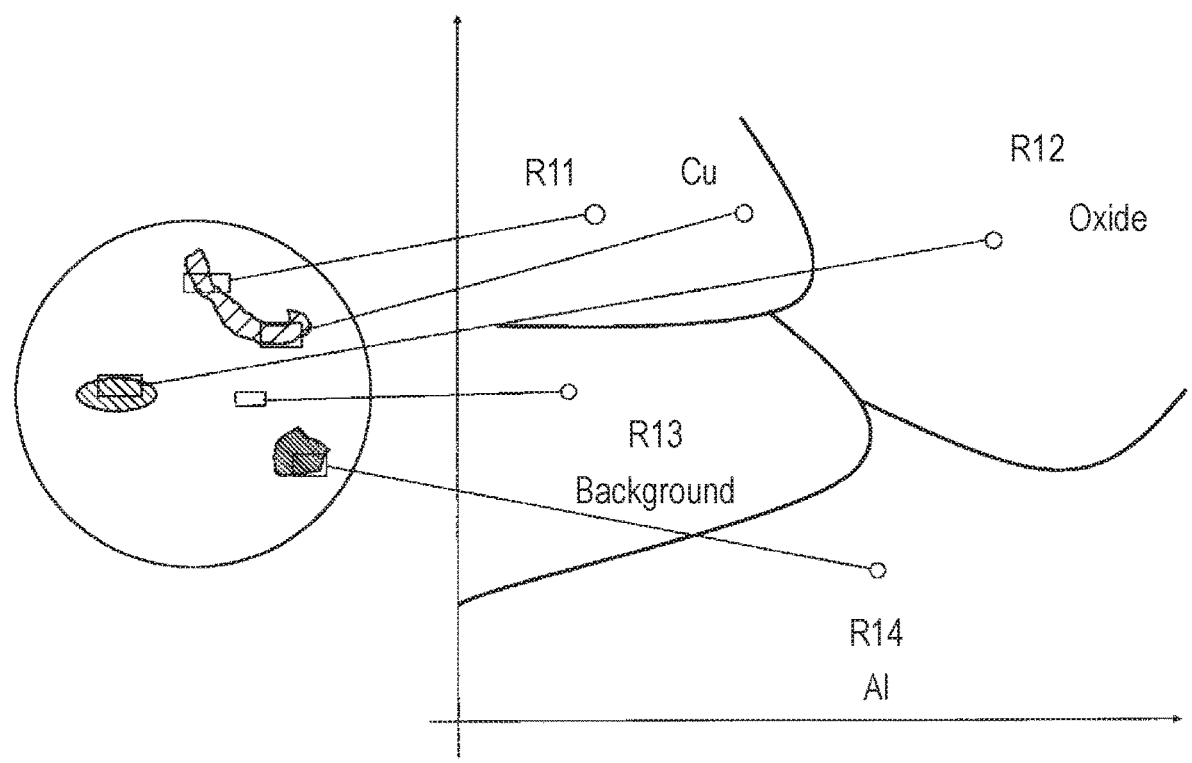
FIG. 11 is a schematic diagram illustrating a specific example of identifying a category of physical property information based on rule information of the learning system according to Embodiment 1.

Next, processing unit 104 identifies one category of the physical property information among the plural categories based on rule information 106 (step S03). FIG. 11 is a schematic diagram illustrating a specific example of identifying a category of the physical property information based on rule information 106. A main component space including regions R11 to R14 illustrated in FIG. 11 is the same as the main component space illustrated in FIG. 5.

In a case where physical property information acquisition unit 102 acquires the physical property information of teacher sample 10 as illustrated in FIG. 11 in step S02, reflection spectrum information for each pixel of the image data is obtained. By performing main component analysis on the reflection spectrum information for each pixel of the image data, as illustrated in FIG. 11, feature data of each pixel of the image data is mapped in the main component space.

For example, in a case where feature data of a pixel of the image data is mapped in region R11 of the main component space illustrated in FIG. 11, it can be identified that a material appearing in the pixel is Cu. A material or a category of an object appearing in each pixel of the image data is thus identified.

Step S01 may be performed after step S02 and step S03.

As illustrated in FIG. 10, processing unit 104 generates teacher data 107 relating the image data imaged by camera 101 to the category identified in step S03, and stores teacher data 107 in storage unit 105 (step S04).

In learning processing, steps S01 to S04 are performed on a large number of pieces of teacher samples 10. When a required number of pieces of teacher data 107 are generated, generation of teacher data 107 is finished (step S05).

In steps S01 to S05, learning system 1 automatically performs generation of a large amount of teacher data 107, in particular, category specification, without any human means. Therefore, as compared with a case where a person relates the category to the image data, man-hours is significantly reduced, and a human error is reduced.

Finally, processing unit 104 generates learning model 110 by learning a model by machine learning based on the large number of stored teacher data 107 (step S06). Learning model 110 thus generated causes a computer to output, in an inspection stage, a category of an inspection sample in response to an input of image data of the inspection sample.

1-3. Effects

As described above, in accordance with the present embodiment, learning device 100 includes camera 101 that acquires image data by imaging teacher sample 10, physical property information acquisition unit 102 that acquires physical property information of teacher sample 10, and processing unit 104 that generates learning model 110. Processing unit 104 identifies a category of teacher sample 10 based on rule information 106 relating the physical property information to the category, generates teacher data 107 by relating the identified category to the image data, and generates learning model 110 which outputs a category of a sample in response to an input of image data of the sample, by machine learning using teacher data 107.

By acquiring the physical property information of teacher sample 10 in addition to the image data, learning device 100 automatically performs a process of creating the teacher data by relating the category to the image data. Therefore, as compared with a case where a person relates the category to the image data, man-hours is significantly reduced, and a human error in category identification is reduced.

Exemplary Embodiment 2

Figure 12:
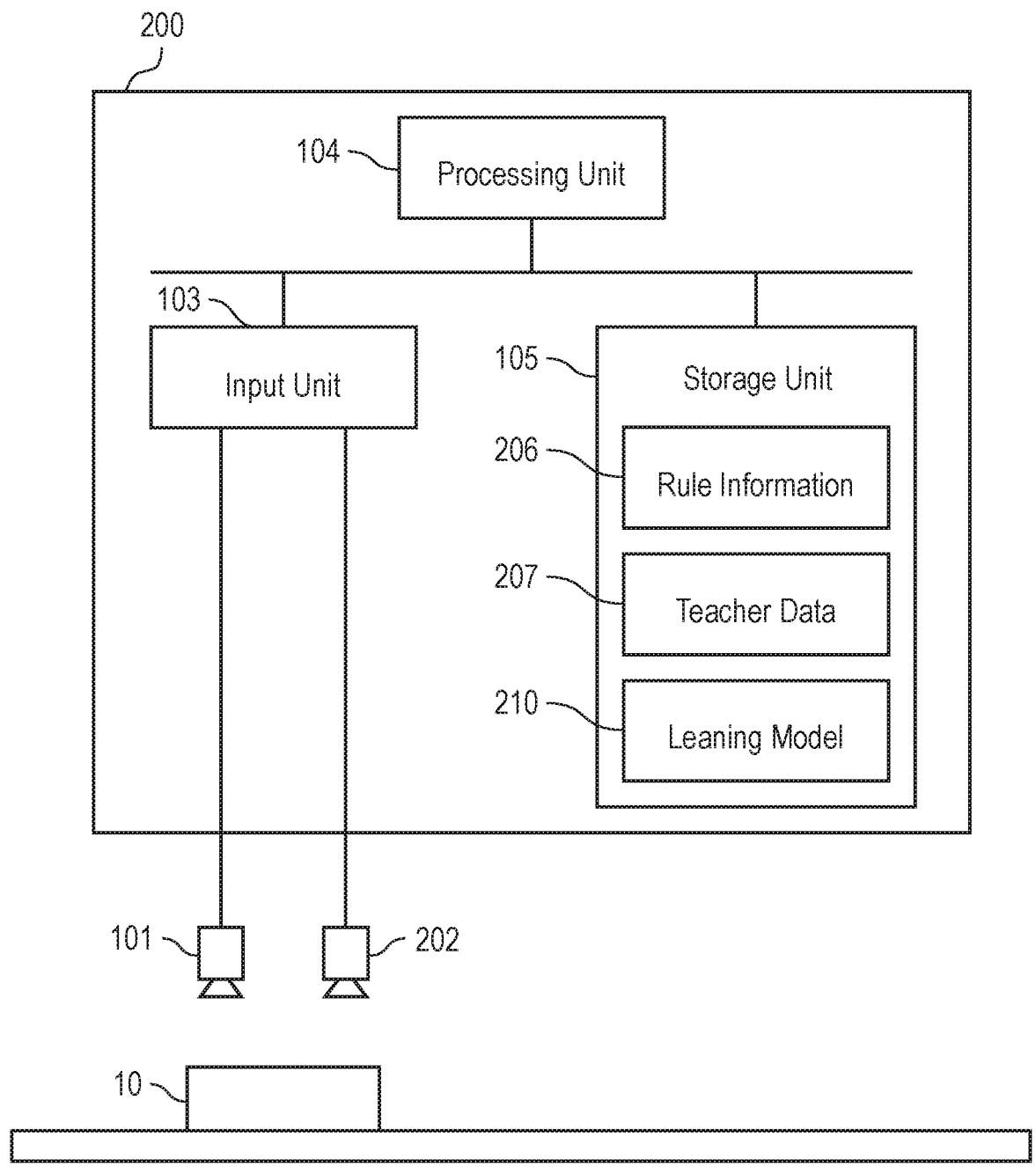
FIG. 12 illustrates a learning system according to Exemplary Embodiment 2.

FIG. 12 is a diagram illustrating a configuration of learning system 2 according to Embodiment 2. Unlike Embodiment 1, learning system 2 includes physical property information acquisition unit 202 instead of physical property information acquisition unit 102. Physical property information acquisition unit 202 is a surface shape measurement unit. In the present embodiment, the physical property information is physical or optical information indicating a surface shape such as unevenness of a surface of teacher sample 10.

The surface shape measurement unit, which is physical property information acquisition unit 202, is a device that measures a surface shape, such as unevenness, of a surface of teacher sample 10. For example, the surface shape measurement unit is a laser microscope, a white light interferometer, a scanning type electron microscope, or the like.

Figure 13A:
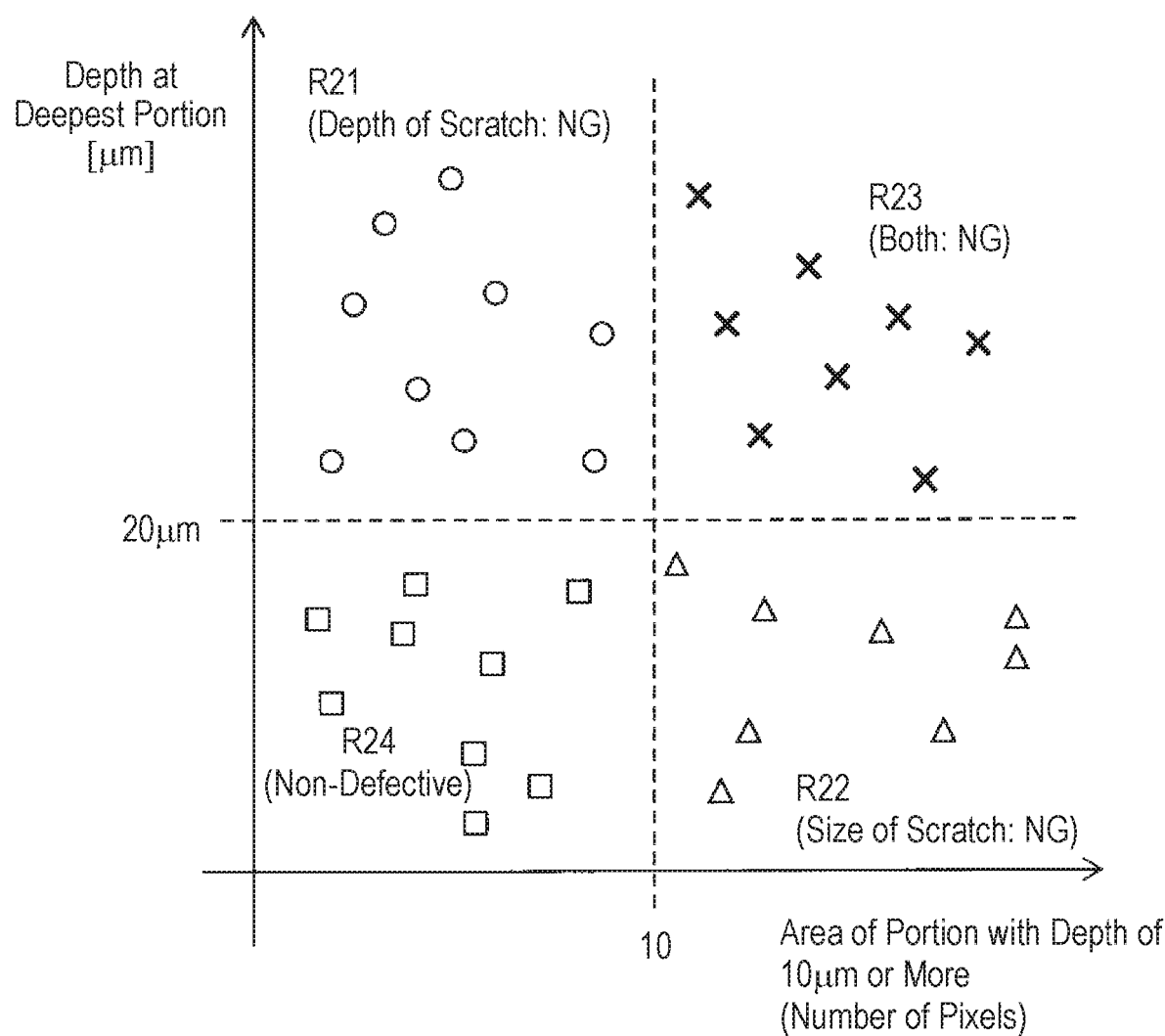
FIG. 13A is a schematic diagram for explaining an example of rule information of the learning system according to Embodiment 2.

FIG. 13A is a schematic diagram for explaining an example of rule information 206. For example, a depth of a deepest portion and an area of a portion having a depth of 10 μm or more are extracted from surface shape data of teacher sample 10 obtained by physical property information acquisition unit 202, which is the surface shape measurement unit. Further, as illustrated in FIG. 13A, data extracted from the surface shape data of teacher sample 10 is mapped on a graph having a vertical axis representing the depth of the deepest portion and a horizontal axis representing the area of the portion having a depth of 10 μm or more.

In accordance with Embodiment 2, teacher sample 10 is plotted and mapped in one of four regions R21 to R24 illustrated in FIG. 13A according to a depth and an area of a scratch of teacher sample 10. Specifically, in FIG. 13A, teacher sample 10 having a scratch in which the depth of the deepest portion is 20 μm or more and the area of the portion having a depth of 10 μm or more is less than 10 pixels is plotted in region R21. Teacher sample 10 plotted in region R21 is a non-defective product in terms of the area of the scratch, but is a defective product in terms of the depth of the scratch. Teacher sample 10 having a scratch in which the depth of the deepest portion is less than 20 μm and the area of the portion having a depth of 10 μm or more is 10 pixels or more is plotted in region R22. Teacher sample 10 plotted in region R22 is a non-defective product in terms of the depth of the scratch, but is a defective product in terms of the area of the scratch. Teacher sample 10 having a scratch in which the depth of the deepest portion is 20 μm or more and the area of the portion having a depth of 10 μm or more is 10 pixels or more is plotted in region R23. Teacher sample 10 plotted in region R23 is a defective product in terms of the area of the scratch, and also is a defective product in terms of the depth of the scratch. Teacher sample 10 having a scratch in which the depth of the deepest portion is less than 20 μm and the area of the portion having a depth of 10 μm or more is less than 10 pixels is plotted in region R24. Teacher sample 10 plotted in region R24 is a non-defective product in terms of the area of the scratch, and also is a non-defective product in terms of the depth of the scratch. Rule information 206 corresponds to a depth, which serves as a reference when counting an area, and a boundary line between the regions. Based on rule information 206, a category corresponding to the data indicating the surface shape is identified.

In accordance with the present embodiment, the category is, for example, the presence/absence of scratches (recesses) or foreign matters (projections) on the sample surface. In a case where there is a scratch or a foreign matter on the sample surface, the category is a large/small size of an area of the scratch or the foreign matter. Specifically, the category is whether or not a length of a scratch or a foreign matter is longer than a predetermined value, whether or not an area of a scratch or a foreign matter is larger than a predetermined value, or whether or not a depth of a scratch or a height of a foreign matter is larger than a predetermined value. Alternatively, the category may be a position of a scratch or a foreign matter on the sample surface.

Instead of or in addition to the category, as illustrated in FIG. 13B and FIG. 13C, based on rule information 206, in a case where there is a scratch or a foreign matter on the surface of teacher sample 10, teacher sample 10 may be determined as a defective product. In a case where there is no scratch or foreign matter on the surface of teacher sample 10, teacher sample 10 may be determined as a non-defective product. Rule information 206 may be a combination of pieces of the rule information. Rule information 206 is not limited to the information.

FIGS. 14A to 14C are schematic diagrams illustrating examples of teacher data 207. FIG. 14A illustrates an example of teacher data 207 in which an input image is related to a category indicating the presence or absence of a scratch included in the input image and a size of the scratch. The size of the scratch may indicate whether or not the size is equal to or larger than a predetermined size as illustrated in FIG. 14A. Alternatively, the category may indicate a length of the scratch and/or a width of the scratch.

The category related to the image data of teacher data 207 may be a defective product or a non-defective products as illustrated in FIG. 14B and FIG. 14C. For a sample No. 3 with a small scratch, in FIG. 14B, the input image of the sample is related to a category indicating a defective product, whereas in FIG. 14C, the input image of the sample is related to a category indicating a non-defective product. This is due to a difference in rule information 206. For example, in rule information 206, in a case where teacher sample 10 having a scratch is regarded as a defective product regardless of a size of the scratch, teacher data 207 as illustrated in FIG. 14B is generated. On the other hand, in rule information 206, in a case where teacher sample 10 having a scratch smaller than a predetermined size is regarded as a non-defective product, teacher data 207 as illustrated in FIG. 14C is generated.

A flow of learning processing by learning system 2 according to the present embodiment will be described below. The flowchart is the same as the flowchart in FIG. 10 except that physical property information acquisition unit 102, which is a hyperspectral camera, is changed to physical property information acquisition unit 202, which is a surface shape measurement unit. Thus, the learning processing will be described with reference to FIG. 10 by replacing physical property information acquisition unit 102 with physical property information acquisition unit 202.

First, camera 101 generates image data based on imaging teacher sample 10 (corresponding to step S01 of FIG. 10). Further, physical property information acquisition unit 202, which is a surface shape measurement unit, acquires surface shape information, such as height information of the surface of teacher sample 10 (corresponding to step S02 of FIG. 10). Processing unit 104 acquires the image data and the surface shape information, and maps feature data, such as a size or a depth, of a scratch. Since there is a boundary line corresponding to rule information 206 in the mapped space, processing unit 104 identifies a category of each pixel of the image data, for example, the presence/absence of a scratch, based on the mapping position (corresponding to step S03 of FIG. 10).

Next, processing unit 104 generates teacher data 207 relating the identified category to the image data imaged by camera 101, and stores teacher data 207 in storage unit 105 (corresponding to step S04 of FIG. 10). Next, processing unit 104 repeats the processing of steps S01 to S04 until pieces of teacher data 207 required to generate a learning model are generated (corresponding to step S05 of FIG. 10).

Finally, processing unit 104 generates learning model 210 by learning a model by machine learning based on the pieces of teacher data 207 (corresponding to step S06 of FIG. 10).

Exemplary Embodiment 3

Figure 15:
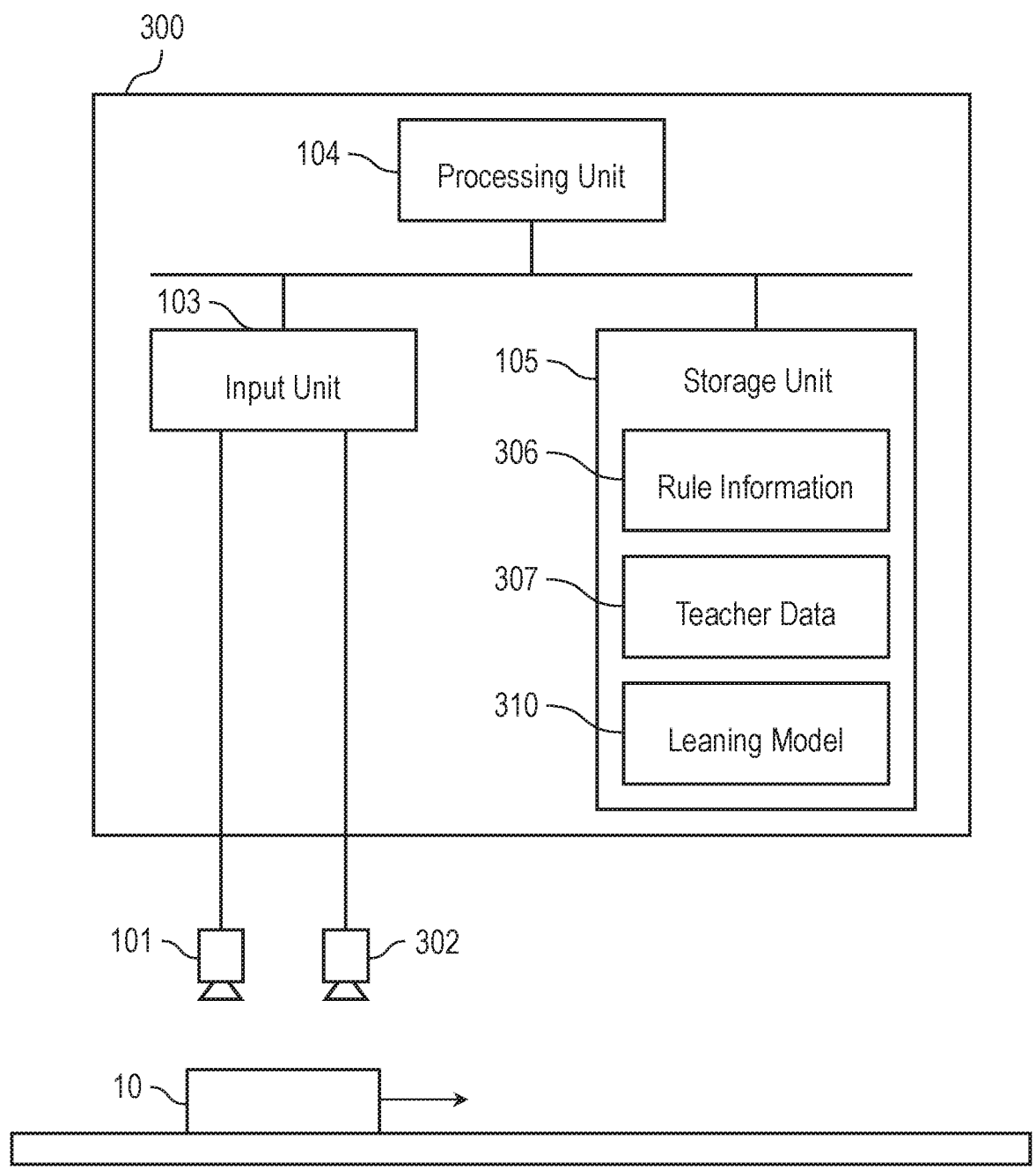
FIG. 15 illustrates a learning system according to Exemplary Embodiment 3.

FIG. 15 is a diagram illustrating a configuration of learning system 3 according to Exemplary Embodiment 3. Unlike Embodiment 1 and Embodiment 2, learning system 3 includes physical property information acquisition unit 302 instead of physical property information acquisition units 102 and 202. Physical property information acquisition unit 302 is an X-ray electron spectroscopic device.

In accordance with the present embodiment, the physical property information is an X-ray electron spectroscopic spectrum, which is energy of photoelectrons and the number of the photoelectrons per unit time, the photoelectrons being emitted from teacher sample 10 when teacher sample 10 is irradiated with X-rays. The X-ray electron spectroscopic spectrum is used as information indicating a composition of a material of teacher sample 10.

Physical property information acquisition unit 302, which is an X-ray electron spectroscopic device, irradiates the surface of teacher sample 10 with X-rays, and identifies an element on the surface of teacher sample 10 based on the energy of the photoelectrons emitted from teacher sample 10 and the number of the photoelectrons per unit time.

Figure 16:
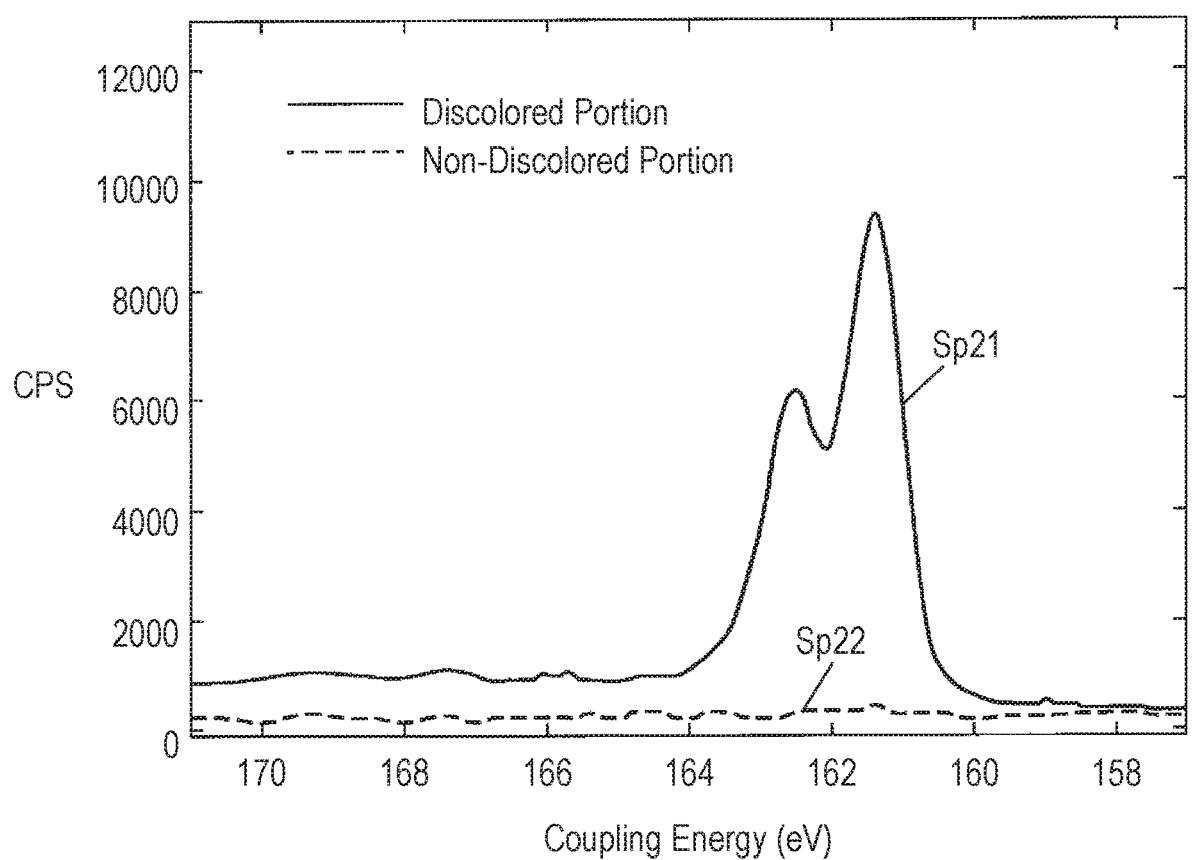
FIG. 16 is a graph illustrating an example of a spectrum obtained by measuring a surface of a silver plate obtained by an X-ray electron spectroscopic method of the learning system according to Embodiment 3.

FIG. 16 is a graph illustrating an example of a spectrum obtained by measuring a surface of a silver plate using an X-ray electron spectroscopic method. A horizontal axis of the graph in FIG. 16 represents a binding energy of electrons, and a vertical axis of the graph in FIG. 16 represents the measured number of photoelectrons per unit time (counts per second, CPS). The silver plate includes a discolored portion that is discolored from a simple substance of silver, and a non-discolored portion that is not discolored from a simple substance of silver. FIG. 16 illustrates measured spectrum Sp21 of the discolored portion (solid line) and measured spectrum Sp22 of the non-discolored portion (broken line). The graph of FIG. 16 illustrates that the measured discolored portion of the silver plate contains silver sulfide (Ag2S). As described above, in the present embodiment, the element on the surface of teacher sample 10 is identified, and the category can be identified.

In accordance with the present embodiment, by performing main component analysis on the spectrum obtained by physical property information acquisition unit 302, which is an X-ray electron spectroscopic device, rule information 306 for identifying a category corresponding to the element on the surface of teacher sample 10 is determined.

Teacher data 307 according to the present embodiment is, for example, data in which an input image is related to a category indicating a type of impurities included in the input image. In addition to the information, teacher data 307 may include information on whether teacher sample 10 corresponding to the input image is defective or non-defective.

The flowchart illustrating the flow of the learning processing by learning system 3 according to the present embodiment is the same as the flowchart in FIG. 10 except that physical property information acquisition unit 102, which is a hyperspectral camera, is changed to physical property information acquisition unit 302, which is an X-ray electron spectroscopic device.

Exemplary Embodiment 4

Figure 17:
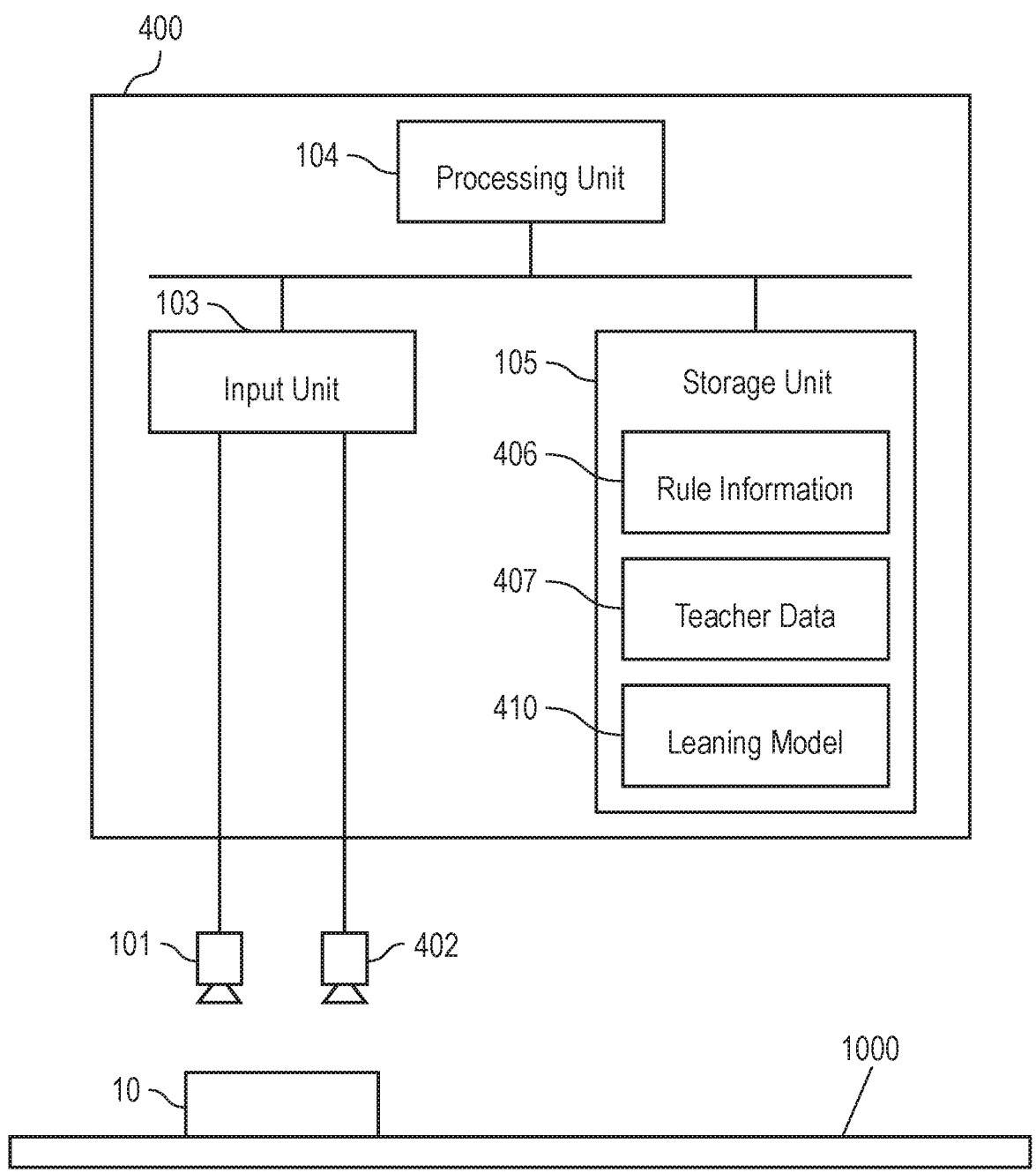
FIG. 17 illustrates a learning system according to Exemplary Embodiment 4.

FIG. 17 is a diagram illustrating a configuration of learning system 4 according to Embodiment 4. Unlike Embodiment 1 to Embodiment 3, learning system 4 includes physical property information acquisition unit 402, which is a high-speed camera, instead of physical property information acquisition units 102, 202, and 302. In the present embodiment, the physical property information is optical information of teacher sample 10 obtained by physical property information acquisition unit 402, which is a high-speed camera with a high frame rate.

The high-speed camera as physical property information acquisition unit 402 is a camera in which the number of frames imaged in one second (frames per second, fps) is 100 frames or more, and acquires a temporal detailed image, that is, a high-speed image as physical property information. For example, physical property information acquisition unit 402 as a high-speed camera has a frame rate of 300 fps, which is a frame rate of 10 times or more the frame rate of camera 101. The frame rate of physical property information acquisition unit 402 as a high-speed camera may be higher, and may be, for example, 1000 fps, 5000 fps, or 10000 fps.

When teacher sample 10 moving on sample line 1000 at a high speed is imaged by a normal camera 101 with a frame rate of approximately 20 fps to 60 fps, that is, not a high frame rate, even in a case where there is a scratch on the surface of teacher sample 10, the scratch is imaged to be blurred, and as a result, an area of the scratch, the presence or absence of the scratch, or a position of the scratch cannot be determined. On the other hand, a high-speed camera as physical property information acquisition unit 402 clearly images teacher sample 10 moving on sample line 1000 at a high speed, and thus, an area of the scratch, the presence or absence of the scratch, or a position of the scratch can be determined.

As described above, when camera 101 images teacher sample 10 moving on sample line 1000 at a high speed, a size of a scratch, the presence or absence of a scratch, a position of a scratch, or the like cannot be determined. On the other hand, feature data indicating a scratch may be extracted from data of a blurred image obtained by imaging a sample with a scratch by camera 101. Therefore, learning device 400 generates teacher data 407 by relating the data of the blurred image of teacher sample 10 acquired by camera 101 to a clear high-speed image of teacher sample 10 acquired by physical property information acquisition unit 402 as a high-speed camera, and learns a learning model based on teacher data 407. This configuration determines a size of a scratch, the presence or absence of a scratch, a position of a scratch, and the like even from the data of the blurred image.

Rule information 406 according to the present embodiment is information for identifying a category corresponding to the high-speed image information imaged by physical property information acquisition unit 402, which is a high-speed camera. The category is, for example, the presence/absence of scratches (recesses) or foreign matters (projections) on the sample surface. In a case where there is a scratch or a foreign matter on the sample surface, the category is a large/small size of the scratch or the foreign matter. Specifically, the category is whether or not a length of a scratch or a foreign matter is longer than a predetermined value, whether or not an area of a scratch or a foreign matter is larger than a predetermined value, or whether or not a depth of a scratch or a height of a foreign matter is larger than a predetermined value. Alternatively, the category may be a position of a scratch or a foreign matter on the sample surface.

Instead of or in addition to the category, based on rule information 406, in a case where there is a scratch or a foreign matter on the surface of teacher sample 10, teacher sample 10 may be determined as a defective product. In a case where there is no scratch or foreign matter on the surface of teacher sample 10, teacher sample 10 may be determined as a non-defective product.

FIG. 18A and FIG. 18B are schematic diagrams illustrating examples of teacher data 407. FIG. 18A illustrates an example of teacher data 407 relating an input image imaged by camera 101 to a category indicating the presence or absence of a scratch or a foreign matter included in the input image. In addition to the information, as illustrated in FIG. 18B, teacher data 407 may include information on whether teacher sample 10 corresponding to the input image is defective or non-defective.

The flowchart illustrating a flow of the learning processing by learning system 4 according to the present embodiment is the same as the flowchart in FIG. 10 except that physical property information acquisition unit 102, which is a hyperspectral camera, is changed to physical property information acquisition unit 402, which is a high-speed camera.

As described above, learning device 400 learns a large amount of teacher data 407 in which the data of the blurred image of teacher sample 10 acquired by camera 101 and the clear high-speed image of teacher sample 10 acquired by physical property information acquisition unit 402 as a high-speed camera are associated with each other. Thereby, even when data of a blurred image is input, learning device 400 can determine a size of a scratch, the presence or absence of a scratch, a position of a scratch, and the like, and perform category assignment.

Exemplary Embodiment 5

Figure 19:
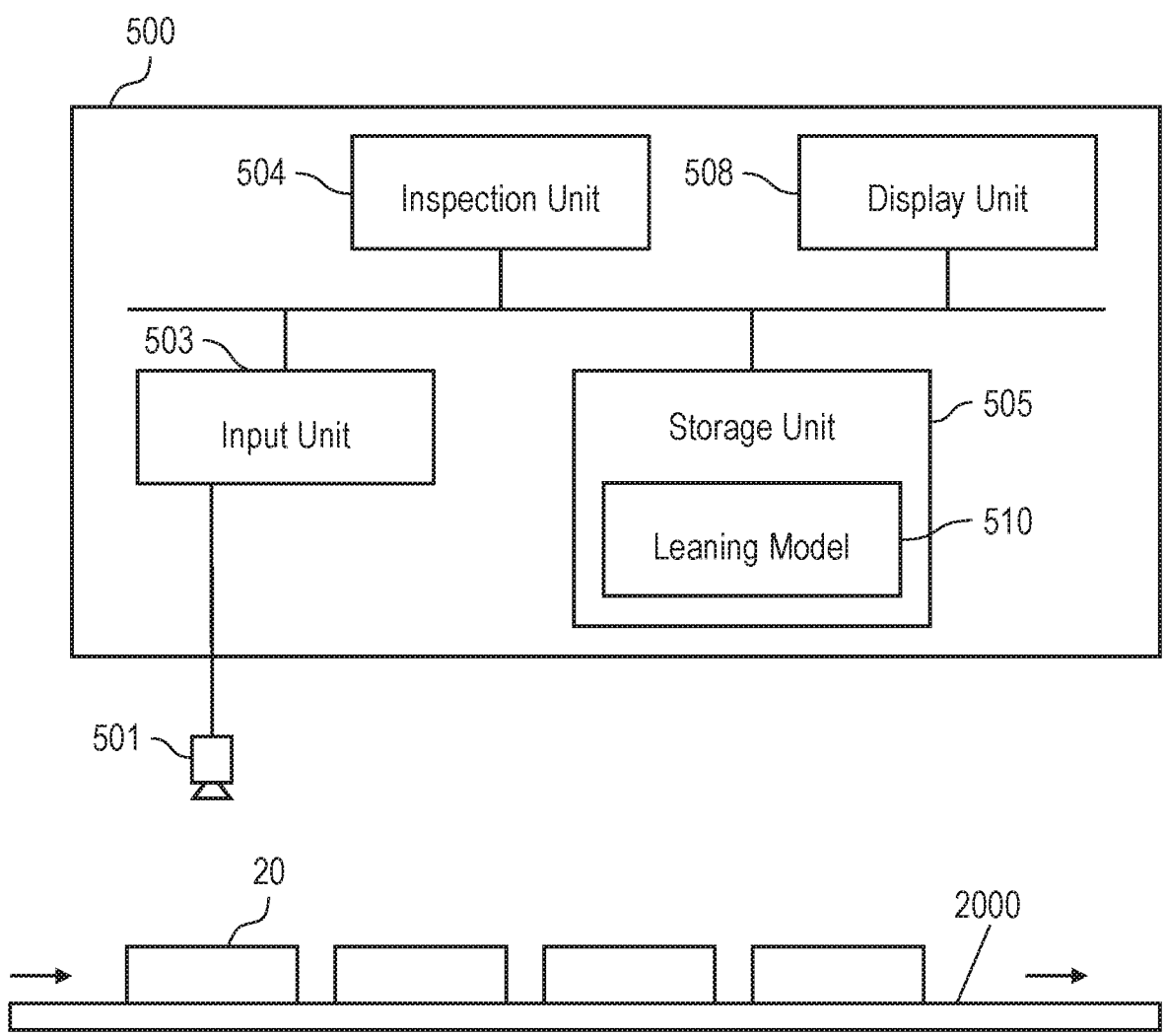
FIG. 19 illustrates an inspection system according to Exemplary Embodiment 5.

FIG. 19 is a diagram illustrating a configuration of inspection system 5 according to Embodiment 5. Inspection system 5 inspects inspection target sample 20 moving on inspection line 2000 by using one of learning models generated by learning systems 1 to 4 according to Embodiment 1 to Embodiment 4, and, for example, assigns a category to inspection target sample 20 or classifies inspection target sample 20 into a defective product or a non-defective product.

Inspection system 5 includes inspection device 500, camera 501, which is an inspection camera that images inspection target sample 20, input unit 503 that receives image data imaged by camera 501, storage unit 505 that stores learning model 510 and the like, and inspection unit 504 that performs inspection processing using learning model 510. Inspection device 500 further includes display unit 508, such as a liquid crystal display or an organic EL display, for displaying an inspection result thereon.

Inspection unit 504 is a controller that controls the entire operation of inspection device 500, and includes a general-purpose processor, such as a CPU, an MPU, or a GPU.

Storage unit 505 is a recording mediums such as a RAM, a ROM, a hard disk, or an SSD. Storage unit 505 stores rule information 506 for determining a category of physical property information, teacher data 507, learning model 510, and the like.

Input unit 503 is an interface circuit (module) that connects inspection device 500 and peripheral devices. As input unit 503, various interfaces such as USB, HDMI, IEEE1394, and Bluetooth are used.

Camera 501 is, for example, an RGB camera including an image sensor such as a CCD or a CMOS image sensor.

Learning model 510 is, for example, one of learning models 110, 210, 310, and 410 generated by learning systems 1 to 4 according to Embodiments 1 to 4. Inspection device 500 may use a learning model in another device via a network, instead of using learning model 510 stored in advance in inspection device 500, that is, in storage unit 505 of inspection device 500 as illustrated in FIG. 19. Therefore, a place where learning model 510 is learned may be different from a place where learning model 510 is used for inspection. For example, learning of learning model 510 may be performed in a laboratory or the like, and inspection by inspection device 500 may be performed in a line of a factory. On the other hand, a place where learning model 510 is learned may be identical to a place where learning model 510 is used for inspection.

Figure 20:
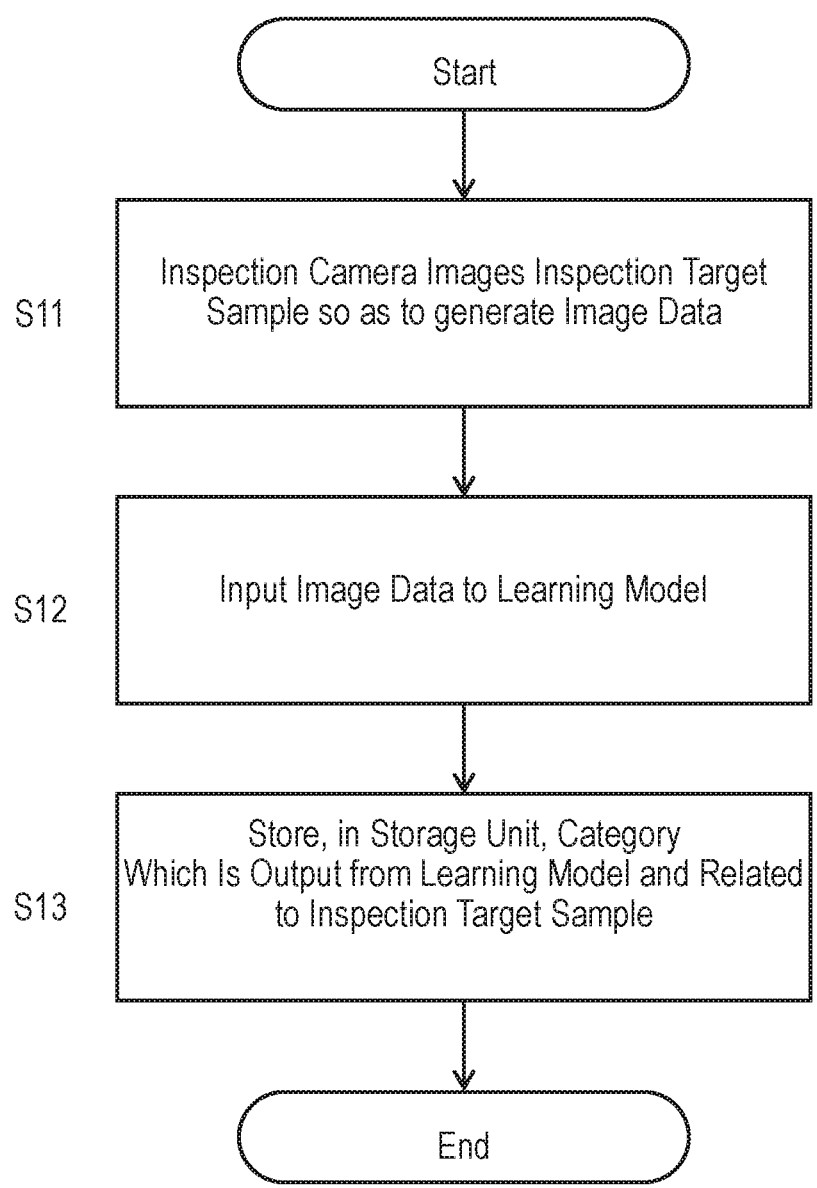
FIG. 20 is a flowchart illustrating an example of inspection by the inspection system according to Embodiment 5.

FIG. 20 is a flowchart illustrating an example of a flow of inspection by inspection system 5 according to the present embodiment. First, camera 501 generates image data by imaging inspection target sample 20 (step S11). Inspection unit 504 of inspection device 500 acquires the image data from camera 501 via input unit 503, and inputs the image data to learning model 510 (step S12). Learning model 510 outputs a category corresponding to the input image data. For example, as the category, an index "non-defective" indicating that inspection target sample 20 is a non-defective product or an index "defective" indicating that inspection target sample 20 is a defective product is output.

The output category information is related to at least one of the input image data and inspection target sample 20, and is stored in storage unit 505 (step S13). The output category may be displayed on display unit 508 for an operator who monitors inspection system 5 to confirm the category.

Exemplary Embodiment 6

Figure 21:
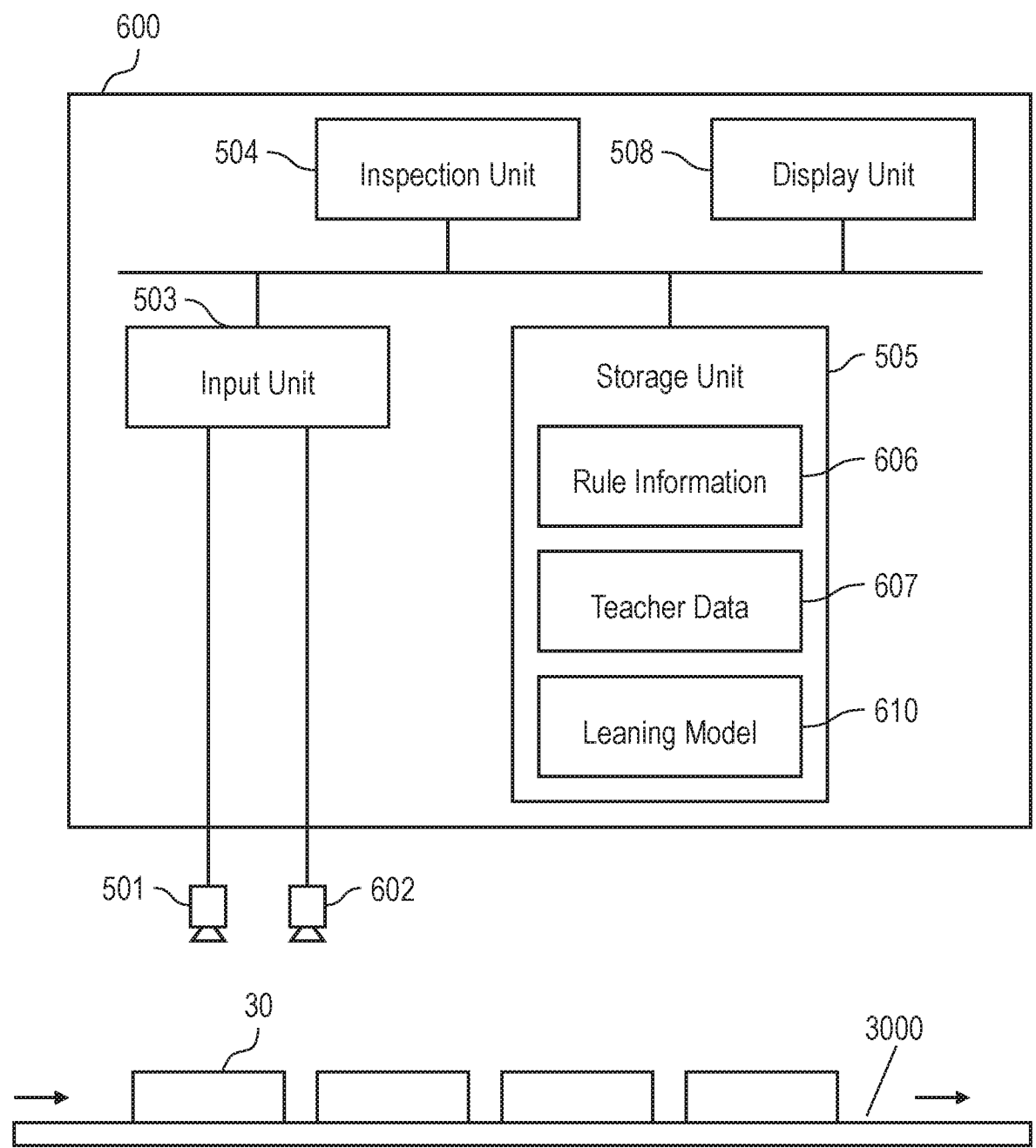
FIG. 21 illustrates an inspection system according to Exemplary Embodiment 6.

FIG. 21 is a diagram illustrating a configuration of inspection system 6 according to Embodiment 6. Inspection system 6 includes inspection device 600. Inspection device 600 can generate teacher data 607 by acquiring physical property information of inspection target sample 30 in inspection line 3000, and generate learning model 610.

Generally, in production lines, each production line has different characteristics. This feature is due to, for example, in production lines, a fact that timings of completion of each production line are different, a fact that shapes and materials of components used in each production line are different, or a fact that environments around each production line are different. For this reason, foreign matters, scratches, and the like that may be included in the samples manufactured in the production lines are different for each production line.

In a case where each production line has different characteristics, it is preferable to learn a learning model used in the production line using teacher data based on the samples manufactured in the production line. Therefore, in accordance with the present embodiment, the learning is performed using samples 30 manufactured in the production line in which products are actually manufactured in large quantities.

In addition to the configuration of inspection system 5 according to Embodiment 5, inspection device 600 further includes physical property information acquisition device 602 that acquires physical property information of sample 30. Inspection unit 504 has a function of generating teacher data 607 and learning model 610 by processing image data and physical property information and a function of inspecting sample 30 using learning model 610. Storage unit 505 stores rule information 606 for determining a category of physical property information, teacher data 607, learning model 610, and the like.

Physical property information acquisition device 602 is one described in Embodiments 1 to 4, and is, for example, a hyperspectral camera, a surface shape measurement unit, an X-ray electron spectroscopic device, a high-speed camera, or the like.

As in the present embodiment, by using sample 30 manufactured in the production line in which products are actually manufactured, learning model 610 according to the production line can be generated.

Learning model 610 may be obtained by acquiring, via a network, a learning model which is learned in another learning device, and updating the acquired learning model using teacher data 607 generated from sample 30 manufactured in the production line in which products are actually manufactured. In this case, learning model 610 according to the production line can be generated. Physical property information acquisition device 602 may be a further physical property information acquisition device different from the physical property information acquisition device for generating the acquired learning model. On the other hand, as physical property information acquisition device 602, a physical property information acquisition device for generating the acquired learning model may also be used.

FIG. 22 is a configuration diagram of manufacturing system 7 including three production lines 650a, 650b, and 650c. Manufacturing system 7 illustrated in FIG. 22 includes inspection devices 600a, 600b, and 600c, and cameras 501a, 501b, and 501c attached to each inspection device. Physical property information acquisition device 602 is attached to only inspection device 600a among inspection devices 600a, 600b, and 600c.

Physical property information acquisition device 602 is removable from inspection device 600a. Removable physical property information acquisition device 602 may be used to acquire physical property information of teacher samples in other production lines 650b and 650c. In a case where physical property information acquisition device 602 is expensive, physical property information acquisition device 602 which is removable is useful because physical property information acquisition device 602 may be used in plural production lines.

In FIG. 22, in line 650a, teacher data 607a is generated based on image data of teacher sample 10a acquired by camera 501a, physical property information of teacher sample 10a acquired by physical property information acquisition device 602, and rule information 606a. Inspection device 600a learns learning model 610a using teacher data 607a.

FIG. 23 illustrates a state after a state illustrated in FIG. 22. In FIG. 23, physical property information acquisition device 602 is removed from inspection device 600a and is attached to inspection device 600b. In line 650a, inspection device 600a inspects inspection target sample 30a using the generated learning model 610a. In line 650b, inspection device 600b learns learning model 610b by teacher sample 10b.

Even in a case where it takes time to acquire physical property information by physical property information acquisition device 602, at the time of inspection, inspection device 600a performs the inspection with only camera 501a, and thus, the inspection can be performed at high speed.

FIG. 24 illustrates a state after a state illustrated in FIG. 23. In FIG. 24, physical property information acquisition device 602 is removed from inspection device 600b and is attached to inspection device 600c. In lines 650a and 650b, inspection target samples 30a and 30b are inspected. In line 650c, inspection device 600c learns learning model 610c by teacher sample 10c. After the learning is completed, in line 650c, an inspection target sample is inspected with learning model 610c.

Figure 25:
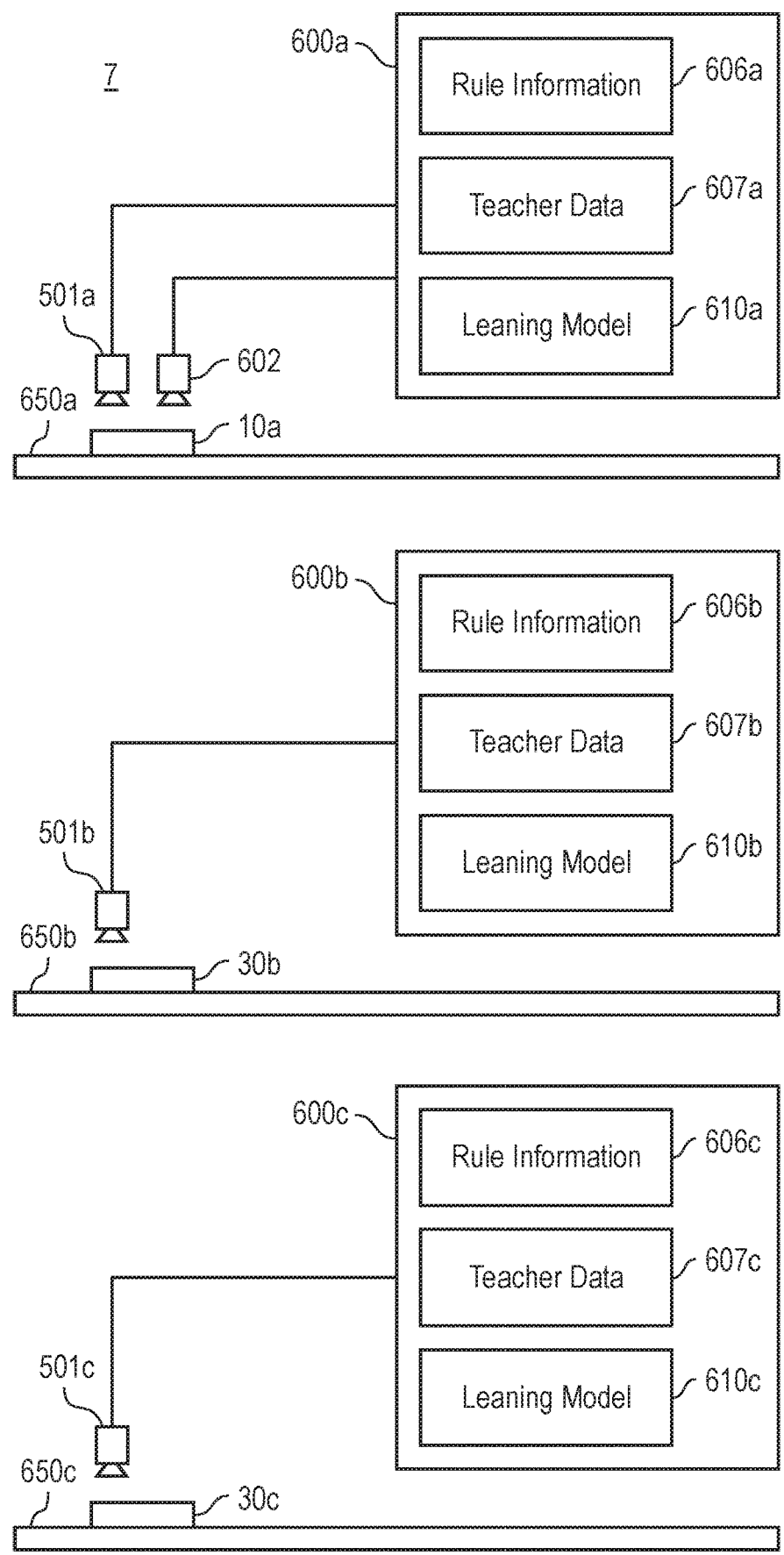
FIG. 25 is a diagram illustrating an example of learning and inspection in three production lines of the inspection system according to Embodiment 6.

FIG. 25 illustrates a state after a state illustrated in FIG. 24. In FIG. 25, physical property information acquisition device 602 is removed from inspection device 600c and is again attached to inspection device 600a. In lines 650b and 650c, inspection target samples 30b and 30c are inspected. In line 650a, inspection device 600a updates learning model 610a by the same process as the process of generating learning model 610 by further teacher sample 10a. After the learning is completed, in line 650a, inspection target sample 30a is inspected with updated learning model 610a (refer to FIG. 23 and FIG. 24).

Other Embodiments

As described above, Embodiment 1 to Embodiment 6 have been described as examples of the technique disclosed in the present application. On the other hand, the technique in the present disclosure is not limited thereto, and changes, substitutions, additions, omissions, and the like may be made in the embodiments as appropriate. Furthermore, by combining components disclosed in Embodiment 1 to Embodiment 6, it is possible to form a new embodiment. Therefore, other embodiments will be exemplified below.

In Embodiment 1, the hyperspectral camera has been described as an example of physical property information acquisition unit 102. Physical property information acquisition unit 102 according to Embodiment 1 may be one that can acquire optical information, which cannot be acquired by an RGB camera that is inexpensive and is easy to be introduced for inspection. Therefore, physical property information acquisition unit 102 according to Embodiment 1 is not limited to the hyperspectral camera. For example, physical property information acquisition unit 102 according to Embodiment 1 may be a multi-spectrum camera that can acquire optical information of a sample with respect to light dispersed into four or more wavelength bands. Further, physical property information acquisition unit 102 according to Embodiment 1 may be a camera that can acquire optical information of a sample with respect to light in a wavelength band other than visible light wavelength bands.

Further, in Embodiment 2 to Embodiment 4, as physical property information acquisition units 202, 302, and 402, the surface shape measurement unit, the X-ray electron spectroscopic device, and the high-speed camera are described. Physical property information acquisition unit may be one that acquires physical property information of a product. Therefore, physical property information acquisition unit is not limited thereto, and may be one that acquires magnetic information, electrical information, thermal information, optical information other than the optical information exemplified in Embodiment 1 to Embodiment 6, or the like.

Specifically, physical property information acquisition unit may be an X-ray diffraction device. An X-ray scattering intensity spectrum differs depending on materials, and thus the X-ray diffraction device can identify a material in a teacher sample or an inspection target sample.

In Embodiment 4, as physical property information acquisition unit 402, the high-speed camera having a high frame rate has been described. In a case where a sample moving at a high speed is imaged by a camera that is inexpensive and is easy to be introduced for inspection, a blurred image of the sample may be obtained. For this reason, physical property information acquisition unit 402 according to Embodiment 4 may be one that can acquire a clear image without blur by imaging a sample moving at a high speed. Therefore, physical property information acquisition unit 402 according to Embodiment 4 is not limited to the high-speed camera having a high frame rate. For example, physical property information acquisition unit 402 according to Embodiment 4 may be a camera having a fast shutter speed. Specifically, physical property information acquisition unit 402 according to Embodiment 4 may be a camera having a shutter speed which is ten times or more the shutter speed of camera 101. For example, physical property information acquisition unit 402 according to Embodiment 4 may be a camera having a shutter speed of $1/400$ second or longer, for example, a shutter speed of $1/400$ second, $1/1000$ second, $1/5000$ second, $1/10000$ second, or $1/133333$ second.

In Embodiment 1 to Embodiment 6, the category determination using rule information and the machine learning are performed by the same processing unit 104. On the other hand, the category determination and the machine learning may be respectively performed by different processing units. For example, one processing unit that performs category determination using rule information may be provided in a learning device, while a further processing unit that performs machine learning may be provided outside the learning device, and the processing units may be connected via a network. That is, processing unit 104 may be configured with a plurality of processing units.

In Embodiment 1 to Embodiment 6, the learning device and the inspection device including one storage unit are illustrated. On the other hand, the storage unit may be configured with a plurality of recording media. For example, the teacher data and the learning model having a large amount of data may be stored in an HDD, and the rule information having a small amount of data may be stored in an SSD or the like. Further, for example, the learning device or the inspection device may include one storage unit such as an HDD or an SSD for storing rule information having a small amount of data, and the teacher data having a large amount of data may be stored in a further storage unit connected to the learning device or the inspection device via a network.

In Embodiment 1 to Embodiment 6, as an example of the category, a foreign matter, an impurity, or a defect including a scratch is described, and as an example of a teacher sample or an inspection target sample, an industrial product such as a silver plate is described. The category may be a classification indicating not only the defect as described above but also a grade or a quality. The teacher sample or the inspection target sample may be one that is to be classified by such a category. Therefore, the teacher sample or the inspection target sample is not limited to an industrial product such as a silver plate. For example, the teacher sample or the inspection target sample may be a food product, such as vegetables or fresh fish, or may be fur, wood, medicine, or the like.

More specifically, the teacher sample or the inspection target sample may be a piece of beef. A reflection spectrum of a piece of fresh beef and a reflection spectrum of a piece of stale beef are different. Therefore, by acquiring physical property information of a teacher sample of a piece of beef by the hyperspectral camera (physical property information acquisition unit 102), plural categories are set for freshness of pieces of beef, that is, qualities of pieces of beef. One category of the plural categories may be identified, and the identified category may be assigned to the teacher sample.

In another example, the teacher sample or the inspection target sample may be wood. Wood is classified into grades, such as wood without knot, wood with a large knot, wood with a medium knot, wood with a small knot, first grade wood, and wood with knots, depending on the number and the size of knots. Further, wood with knot is further graded depending on whether the knot is a live knot, a dead knot, or a loose knot. A type of the knot can be determined by, for example, the hyperspectral camera (physical property information acquisition unit 102) or the surface shape measurement unit (physical property information acquisition unit 202). Therefore, a plurality of categories for the grades of wood may be set. One category of the plurality of categories may be identified, and the identified category may be assigned to the teacher sample.

The number of category items assigned to one teacher sample or one inspection target sample is not limited to one, and plural category items may be assigned. For example, in a case where copper is attached to the surface of one teacher sample, both of a category item indicating a defective product or a non-defective product and a category item indicating a type of an impurity, that is, two or more category items may be assigned.

As described above, the embodiments have been described as examples of the technique according to the present disclosure. The accompanying drawings and the detailed descriptions are provided for explanation of the present disclosure.

Therefore, the components described in the accompanying drawings and the detailed descriptions include not only the components which are essential for solving the problem but also, in order to exemplify the technique, the components which are non-essential for solving the problem. For this reason, even though the non-essential components are described in the accompanying drawings or the detailed descriptions, the non-essential components should not be recognized as essential components.

Further, the embodiments have been presented to exemplify the technique of the present disclosure, and various changes, substitutions, additions, and omissions may be made within the scope of the inventions or the scope of equivalents of the claims.

REFERENCE MARKS IN THE DRAWINGS 1 learning system
10 teacher sample
20 inspection target sample
30 sample
100 learning device
101 camera
102 physical property information acquisition unit
103 input unit
104 processing unit
105 storage unit
106 rule information
107 teacher data
110 learning model
202 physical property information acquisition unit
302 physical property information acquisition unit
402 physical property information acquisition unit
500 inspection device
501 camera
503 input unit
504 inspection unit
505 storage unit
506 rule information
507 teacher data
508 display unit
510 learning model
602 physical property information acquisition device

The invention claimed is:

1. A learning device comprising:
a first camera configure to acquire image data by imaging a sample of a product;
a physical property information acquisition unit configured to acquire physical property information of the sample; and
a processing unit configured to
identify a category of the sample based on rule information relating the physical property information to the category,
generate teacher data by relating the identified category to the image data, and
generate a learning model outputting the category of the sample in response to an input of the image data of the sample by machine learning based on the teacher data.

2. The learning device of claim 1, further comprising a storage unit configured to store the rule information.

3. The learning device of claim 1, wherein the physical property information includes at least one of:
optical information of the sample with respect to light within a wavelength band other than visible light wavelength bands;
optical information of the sample with respect to light dispersed into four or more wavelength bands;
information of a surface structure of the sample; and
image information indicating an image of the sample obtained by a second camera having a frame rate 10 times or more a frame rate of the first camera.

4. The learning device of claim 1, wherein the category is a classification indicating an impurity included in the sample, a defect including a scratch, a grade of the sample, or a quality of the sample.

5. An inspection device comprising:
an inspection camera configured to acquire image data by imaging a product; and
an inspection unit configured to output a category of the product by performing an operation of applying, to the image data, the learning model generated by the processing unit of the learning device of claim 1.

6. The inspection device of claim 5, further comprising
a physical property information acquisition unit configured to acquire physical property information of the product,
wherein the inspection unit configured to identify the category of the product based on the rule information, and to generate teacher data by relating the identified category to the image data, and
wherein the inspection unit configured to update the learning model by learning the learning model based on the teacher data by machine learning using the teacher data.

7. A learning method comprising:
acquiring image data by imaging a sample of a product by a first camera;
acquiring physical property information of the sample by a physical property information acquisition unit;
identifying a category of the sample identifying based on rule information relating the physical property information to the category;
generating teacher data by relating the identified category to the image data; and
generating a learning model outputting the category of the sample in response to an input of the image data of the sample by machine learning using the teacher data.

8. The learning method of claim 7, wherein the sample is manufactured in a production line in which the product is manufactured.

9. The learning method of claim 7, wherein the physical property information includes at least one of:
optical information of the sample with respect to light within a wavelength band other than visible light wavelength bands;
optical information of the sample with respect to light dispersed into four or more wavelength bands;
information of a surface structure of the sample; and
image information indicating an image of the sample obtained by a second camera having a frame rate 10 times or more a frame rate of the first camera.

10. The learning method of claim 7, wherein the category is a classification indicating an impurity included in the sample, a defect including a scratch, a grade of the sample, or a quality of the sample.

11. An inspection method comprising:
acquiring image data by imaging a product by an inspection camera; and
outputting a category of the product by performing an operation of applying, to the image data, a learning model generated by the learning method of claim 7.

12. A learning device comprising:
a first camera configured to image a teacher sample and acquire teacher image data indicating an image of the teacher sample;

a physical property information acquisition unit configured to acquire physical property information of the teacher sample; and a processing unit configured to identify a category of the teacher sample among a plurality of categories based on rule information relating the physical property information to the plurality of categories, generate teacher data by relating the identified category to the teacher image data, and generate a learning model by machine learning using the teacher data, the learning model being a model which outputs a category of an inspection target sample among the plurality of categories based on inspection target image data indicating an image of the inspection target sample.

13. The learning device of claim 12, further comprising a storage unit configured to store the rule information.

14. The learning device of claim 12, wherein the physical property information includes at least one of:

optical information of the teacher sample with respect to light within a wavelength band other than visible light wavelength bands;

optical information of the teacher sample with respect to light dispersed into four or more wavelength bands;

information of a surface structure of the teacher sample; and image information indicating an image of the teacher sample obtained by a second camera having a frame rate 10 times or more a frame rate of the first camera.

15. The learning device of claim 12, wherein the plurality of categories are classifications indicating impurities included in the teacher sample and the inspection target sample, defects including scratches of the teacher sample and the inspection target sample, grades of the teacher sample and the inspection target sample, or qualities of the teacher sample and the inspection target sample.

16. An inspection device comprising:

an inspection camera configured to acquire inspection target image data by imaging an inspection target sample of a product; and an inspection unit configured to perform an operation of applying, to the inspection target image data, the learning model generated by the processing unit of the learning device of claim 12 so as to output the category of the inspection target sample among the plurality of categories.

17. The inspection device of claim 16, further comprising:

a physical property information acquisition unit configured to acquire physical property information of the inspection target sample, wherein the inspection unit is configured to:

identify a category of the inspection target sample among the plurality of categories based on the rule information;

generate further teacher data by relating the identified category to the inspection target image data; and update the learning model by learning the learning model using the further teacher data by machine learning using the further teacher data.

18. A learning method comprising:

acquiring teacher image data indicating an image of a teacher sample of a product by imaging the teacher sample by a first camera;

acquiring physical property information of the teacher sample by a physical property information acquisition unit;

identifying a category of the teacher sample among the plurality of categories based on rule information relating the physical property information to the plurality of categories;

generating teacher data by relating the identified category to the teacher image data; and generating a learning model by machine learning using the teacher data, the learning model outputting a category of an inspection target sample of the product among the plurality of categories based on inspection target image data indicating an image of the inspection target sample.

19. The learning method of claim 18, wherein the physical property information includes at least one of:

optical information of the teacher sample with respect to light within a wavelength band other than visible light wavelength bands;

optical information of the teacher sample with respect to light dispersed into four or more wavelength bands;

information of a surface structure of the teacher sample; and image information indicating an image of the teacher sample obtained by a second camera having a frame rate 10 times or more a frame rate of the first camera.

20. An inspection method comprising:

acquiring image data by imaging a product by an inspection camera; and outputting a category of the product among the plurality of categories by performing an operation of applying the learning model generated by the learning method of claim 18.

21. A learning device comprising a processing unit configured to:

generate teacher data by identifying categories of one or more pixels out of plural pixels of an image of an object based on information relating physical property information and the categories; and generate a learning model by machine learning based on the teacher data, the learning model being configured to output categories of the one or more pixels out of the plural pixels of the image of the object, wherein the processing unit is configured to generate the teacher data by identifying the categories based on rule information relating the physical property information to the categories.

22. The learning device of claim 21, wherein the processing unit is configured to generate the teacher data by identifying a category of each pixel of the plural pixels of the image of the object.

23. The learning device of claim 21, wherein the physical property information comprises optical information of the object with respect to light dispersed into four or more wavelength bands.

24. The learning device of claim 23, wherein the physical property information comprises hyperspectral data.

25. The learning device of claim 23, wherein the teacher data is segmented such that a category of each pixel of the plural pixels of the image is related to the image.

26. A method of generating a learning model, comprising:

generating teacher data by identifying categories of one or more pixels out of plural pixels of an image of an object based on information relating physical property information and the categories; and generating a learning model by machine learning based on the teacher data, the learning model being configured to output categories of the one or more pixels out of the plural pixels of the image of the object, wherein said generating the teacher data comprises generating the teacher data by identifying the categories based on rule information relating the physical property information to the categories.

27. A recording medium recording a program causing a computer to execute a method of generating a learning model, the method comprising:

generating teacher data by identifying categories of one or more pixels out of plural pixels of an image of an object based on information relating physical property information and the categories; and generating a learning model by machine learning based on the teacher data, the learning model being configured to output categories of the one or more pixels out of the plural pixels of the image of the object, wherein said generating the teacher data comprises generating the teacher data by identifying the categories based on rule information relating the physical property information to the categories.

* * * * *